(12) United States Patent
Yang et al.

(10) Patent No.: US 9,775,077 B2
(45) Date of Patent: Sep. 26, 2017

(54) DERIVATION OF EMBMS NEIGHBOR SAI INFORMATION WITH CORRELATION BIT-MAP

(71) Applicant: QUALCOMM Incorporated, San Diego, CA (US)

(72) Inventors: Kenchieh Brian Yang, San Diego, CA (US); Jun Wang, Poway, CA (US); Xiaoxia Zhang, San Diego, CA (US); Ralph Akram Gholmieh, San Diego, CA (US); Nagaraju Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 14/846,335

(22) Filed: Sep. 4, 2015

(65) Prior Publication Data
US 2016/0073302 A1 Mar. 10, 2016

Related U.S. Application Data

(60) Provisional application No. 62/048,191, filed on Sep. 9, 2014.

(51) Int. Cl.
*H04H 1/00* (2006.01)
*H04W 36/00* (2009.01)
*H04W 4/06* (2009.01)

(52) U.S. Cl.
CPC ... *H04W 36/0061* (2013.01); *H04W 36/0072* (2013.01); *H04W 4/06* (2013.01)

(58) Field of Classification Search
CPC H04W 36/0061; H04W 36/0072; H04W 4/06

USPC .................. 370/331, 312, 329, 330, 341
See application file for complete search history.

(56) References Cited

U.S. PATENT DOCUMENTS

| 2012/0236776 | A1 | 9/2012 | Zhang et al. | |
|---|---|---|---|---|
| 2013/0242738 | A1* | 9/2013 | Chang | H04W 4/06 370/235 |
| 2014/0036755 | A1* | 2/2014 | Lee | H04W 36/26 370/312 |
| 2014/0177506 | A1* | 6/2014 | Korus | H04W 4/06 370/312 |

OTHER PUBLICATIONS

International Search Report and Written Opinion—PCT/US2015/048953—ISA/EPO—Dec. 7, 2015.

(Continued)

*Primary Examiner* — Chuong T Ho
(74) *Attorney, Agent, or Firm* — Arent Fox LLP

(57) ABSTRACT

A UE receives a list of neighboring cells of a serving cell serving the UE, and a list of SAIs. The list of neighboring cells may be included in a first system information message and the list of SAIs may be included in a second system information message. The first and second messages may be the same message, e.g., SIB15, or may be different messages SIB4/SIB5 and SIB15. The list of SAI includes those SAI supported by at least one of the serving cell and the neighboring cells. At least one of the SAIs is formatted to include mapping information that maps the SAI to one or more of the neighboring cells included in the list of neighboring cells. The UE processes the at least one SAI to determine the one or more neighboring cells that support the SAI.

30 Claims, 37 Drawing Sheets

(56) References Cited

OTHER PUBLICATIONS

Qualcomm Incorporated et al: "Additional Assistance Information for MBMS UEs", 3GPP Draft; R2-124058, 3rd Generation Partnership Project (3GPP), Mobile Competence Centre; 650, Route Des Lucioles; F-06921 Sophia-Antipolis Cedex; France vol. RAN WG2, no. Qingdao, China; Aug. 13, 2012-Aug. 17, 2012, Aug. 7, 2012 (Aug. 7, 2012), XP050665777, 5 Pages.
Qualcomm Incorporated., et al., "Inclusion of PCI in SIB15", 3GPP Draft; R2-124062, 3rd Generation Partnership Project (3GPP), Mobile Competence Centre ; 650, Route Des Lucioles ; F-06921 Sophia-Antipolis Cedex ; France val. RAN WG2, no. Qingdao; Aug. 13, 2012-Aug. 17, 2012 Aug. 7, 2012 (Aug. 7, 2012), XP050665781, 2 Pages. Retrieved from the Internet: URL: http://www.3gpp.org/ftp/tsg_ran/WG2_RL2/TSGR2_79/Docs/ [retrieved on Aug. 7, 2012].

\* cited by examiner

Sib15:

value BCCH-DL-SCH-Message ::=
{
message c1 : systemInformation :
{
criticalExtensions systemInformation-r8 :
{
sib-TypeAndInfo
{
sib15-v1130 :
{
mbms-SAI-IntraFreq-r11 { 1, 2, tSAI_x, tSAI_y, ...}, ⟵1308
mbms-Neighboring-PCI-List-IntraFreq-r12 { [x1, x2] } ⟵1302
}
mbms-SAI-InterFreqList-r11
{
dl-CarrierFreq-r11 2175, ⟵1314
mbms-SAI-List-r11 { 3, 4. tSAI_x, tSAI_y, ...}, ⟵1310
mbms-Neighboring-PCI-List-IntraFreq-r12 { [y1, y2] } ⟵1304
},
dl-CarrierFreq-r11 2399, ⟵1316
mbms-SAI-List-r11 { 35, 6. tSAI_z, ...}; ⟵1312
mbms-Neighboring-PCI-List-IntraFreq-r12 { [z1, z2] } ⟵1306
}

LTE RRC OTA Packet -- UL_DCCH
    Pkt Version = 7
    RRC Release Number.Major.minor = 10.7.1
    Radio Bearer ID = 1, Physical Cell ID = 75
    Freq = 5230
    SysFrameNum = N/A, SubFrameNum = 0
    PDU Number = UL_DCCH Message, Msg Length = 5
    SIB Mask in SI = 0x00
Interpreted PDU:
value UL-DCCH-Message ::=
    message messageClassExtension : c2 : mbmsInterestIndication-r11 :
        criticalExtensions c1 : interestIndication-r11 :
            mbms-FreqList-r11
            5230
    1802 ~ mbms-pci_cai_interest-r12
        { <Physical_Cell_Id: 391>, <Carrier_Aggregation_Index: CAI> }
                    ~                       ~
                  1804                    1806

Sib15:

value BCCH-DL-SCH-Message ::=
{
  message c1 : systemInformation :
  {
    criticalExtensions systemInformation-r8 :
    {
      sib-TypeAndInfo
      {
        sib15-v1130 :
        {
          mbms-SAI-IntraFreq-r11
          {
            1,2,
          },
          1902 — mbms-Cell-Position-Association-IntraFreq-r12
          {
            0xA3
          },
        }

FIG. 19

SIB15

2500

2502 — mbms-SAI-InterFreqList-r11
  dl-CarrierFreq-r11 2175, —2514
  mbms-SAI-List-r11 {1,2,5}
2508 — MBMS-Cell-PCI_CA:{ [401,CAI], [402, CAI']}   →   (B) optional
  ,
  mbms-SAI-List-r11 {1,4}   →   ( C ) optional
2510 — MBMS-Cell-PCI_CA:{[403,S] }

2504 — mbms-SAI-InterFreqList-r11
  dl-CarrierFreq-r11 2339 —2516
  mbms-SAI-List-r11{1,2,1}
2512 — MBMS-Cell-PCI:{[407,P]}   →   (B) optional

SIB5

2506 — interFreqCarrierFreqList
  dl- CarrierFreq 2175,
  .....
    interFreqNeighCellList
    interFreqNeighCellInfo
      physCellId 401,
      q- OffsetCellIdB0
      physCellId  402,
      q- OffsetCellIdB0
  .....
  dl- CarrierFreq 2399,
  .....
    interFreqNeighCellList
    interFreqNeighCellInfo
      physCellId 407,
      q- OffsetCellIdB0
  ..

FIG. 25

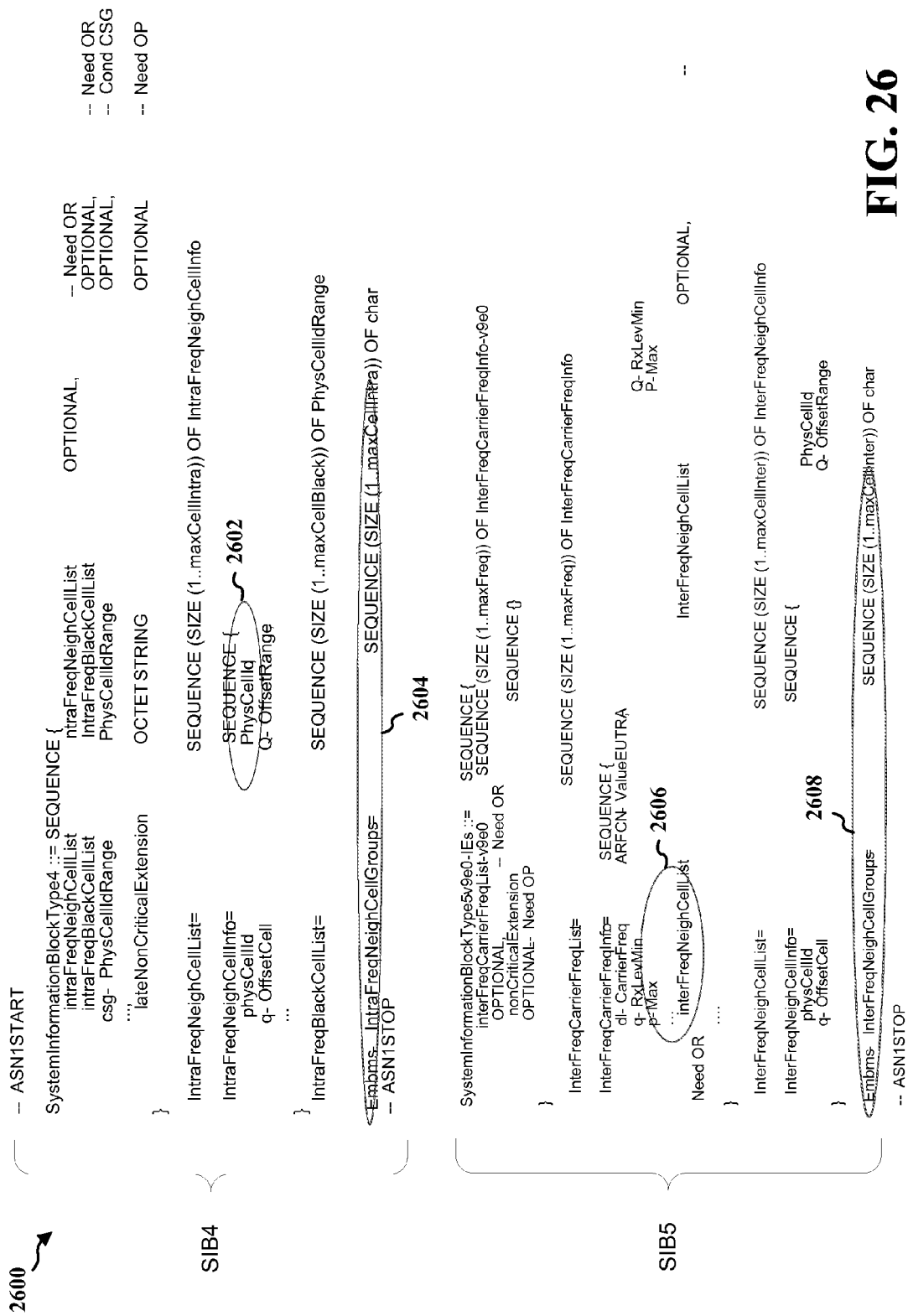

```
sib15-v12xx:
{
  mbms-SAI-IntraFreq-r11
  {
    1,2
  },
  mbms-SAI-IntraFreqNeighbor-r11::
    MBMS-SAIList-r11 {1,2}
2702 ~  MBMS-Cell-Intra-Group-Indices:{0,1} → (A) optional field for backward compatibility
  mbms-SAI-IntraFreqNeighbor-r11::
    MBMS-SAIList-r11 {3,4}
2704 ~  MBMS-Cell-Intra-Group-Indices:{0 } → (A) optional field for backward compatibility
  mbms-SAI-InterFreqList-r11
  {
    dl-CarrierFreq-r11 5230,
    mbms-SAI-List-r11 {1,2,5 }
2706 ~ MBMS-Cell-InterGroup-Indices:{0} →(B) optional field for backward compatibility
  },
}
```

FIG. 27

```
Sib15-v12xx :
{
    Mbms-SAI-IntraFreq-r11
    {
        1,2                           SAIList
    },
    mbms-SAI-IntraFreqNeighbor-r11::
        MBMS-SAIList-r11 {1,2,3,4}
    mbms-SAI-InterFreqList-r11
    {
        dl-CarrierFreq-r11 5230,
                    mbms-SAI-List-r11 {5,6,7,8}
    }
,
HASH    {#MD5_1#}; MBMS-Cell-Intra-Group-Indices:{0,1}  → (A) optional for backward compatibility
HASH    {#MD5_2#}; MBMS-Cell-Intra-Group-Indices:{0}    → (A) optional for backward compatibility
HASH    {#MD5_3#}; MBMS-Cell-Intra-Group-Indices:{1}    → (A) optional for backward compatibility
```

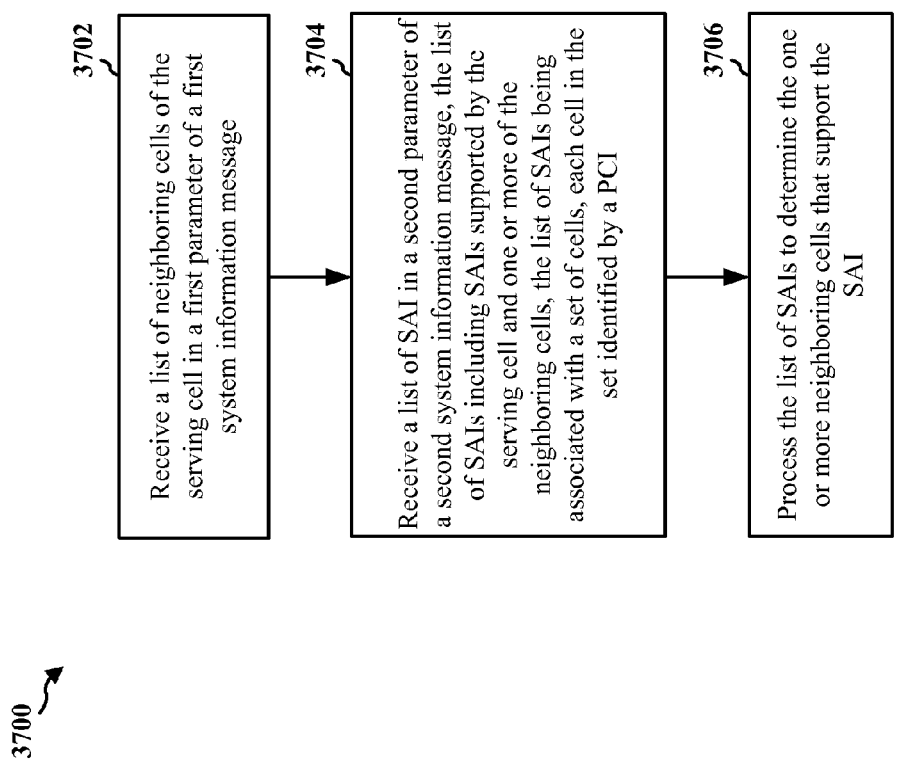

DERIVATION OF EMBMS NEIGHBOR SAI INFORMATION WITH CORRELATION BIT-MAP

CROSS-REFERENCE TO RELATED APPLICATION(S)

This application claims the benefit of U.S. Provisional Application Ser. No. 62/048,191, entitled "Derivation of eMBMS Neighbor SAI Information with Correlation Bit-Map" and filed on Sep. 9, 2014, which is expressly incorporated by reference herein in its entirety.

BACKGROUND

Field

The present disclosure relates generally to communication systems, and more particularly, to a derivation of eMBMS neighboring service area identifier (SAI) information with correlation bit-map.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with one or more of the aspects disclosed herein, a user equipment (UE) receives a list of service area identifiers (SAIs) supported by a serving cell on which the UE is camped. The list also includes SAIs supported by the neighboring cells of the serving cell. The SAIs may be formatted to include bit mapping information that maps each SAI to one or more of the neighboring cells. The neighboring cells to be correlated via the bit mapping may correspond to neighboring cells included in a SIB message that provided the SAI list to the UE. For example, a SIB15 may include both the SAI list and a list of neighboring cells. Alternatively, the neighboring cells to be correlated via the bit mapping may be included in a list of neighboring cells provided to the UE in a separate SIB message, different from the SIB message that provided the SAI list. For example, a SIB15 may include the SAI list while one or more of SIB4 or SIB5 may include a list of neighboring cells. The bit mapping allows for the UE to obtain a mapping of SAIs to neighboring cells. The bit mapping is beneficial in that the bit mapping provides more efficient eMBMS service activation under a multi-cells, multi-band scenario, extends intra-frequency cell coverage at the cell border, and provides for more precise request of a specific cell for carrier aggregation support to eMBMS services.

In an aspect of the disclosure, a method, a computer program product, and an apparatus are provided. A UE receives a list of neighboring cells of the UE's serving cell. The list of neighboring cells may be included in a first parameter of a first system information message. The UE also receives a list of SAIs. The SAI list may be included in a second parameter of a second system information message. The list of SAIs includes those SAIs supported by the serving cell and one or more of the neighboring cells. At least one of the SAIs is formatted to include mapping information that maps the SAI to one or more of the neighboring cells included in the list of neighboring cells. The UE processes the at least one SAI to determine the one or more neighboring cells that support the SAI. The one or more neighboring cells may be either of an inter-frequency neighboring cell or an intra-frequency neighboring cell.

In another aspect, a network component, such as a base station, includes a list of neighboring cells of a serving cell in a first system information message; and a list of SAIs in a second system information message. The first system information message and the second system information may be the same message, e.g., SIB15. The first system information message and the second system information may be different messages. For example, the first system information message may be one of a SIB4 or SIB5, while the second system information message may be a SIB15. The list of SAIs includes SAIs supported by the serving cell and one or more of the neighboring cells. The network component formats at least one of the SAIs to include mapping information that maps the SAI to one or more of the neighboring cells included in the list of neighboring cells.

BRIEF DESCRIPTION OF THE DRAWINGS

FIG. 13 is an example SIB15 with additional intra-frequency and inter-frequency physical cell identifier (PCI) list parameters.

FIG. 18 is an illustration of an eMBMS interest indicator message that includes an additional parameter, mbms-pci_c-ai_interest.

FIG. 19 is an example SIB15 with an mbms Cell Position-Association (CPA) for Inter-Frequency parameter.

FIG. 24, FIG. 25, and FIG. 26 are illustrations of portions of SIB15, SIB5 and SIB4.

FIG. 27 is an illustration of a simplified SIB15.

FIG. 28 is an illustration of a SIB15 including a hash.

FIG. 37 is a flow chart of a method of wireless communication of a user equipment.

DETAILED DESCRIPTION

Figure 1:
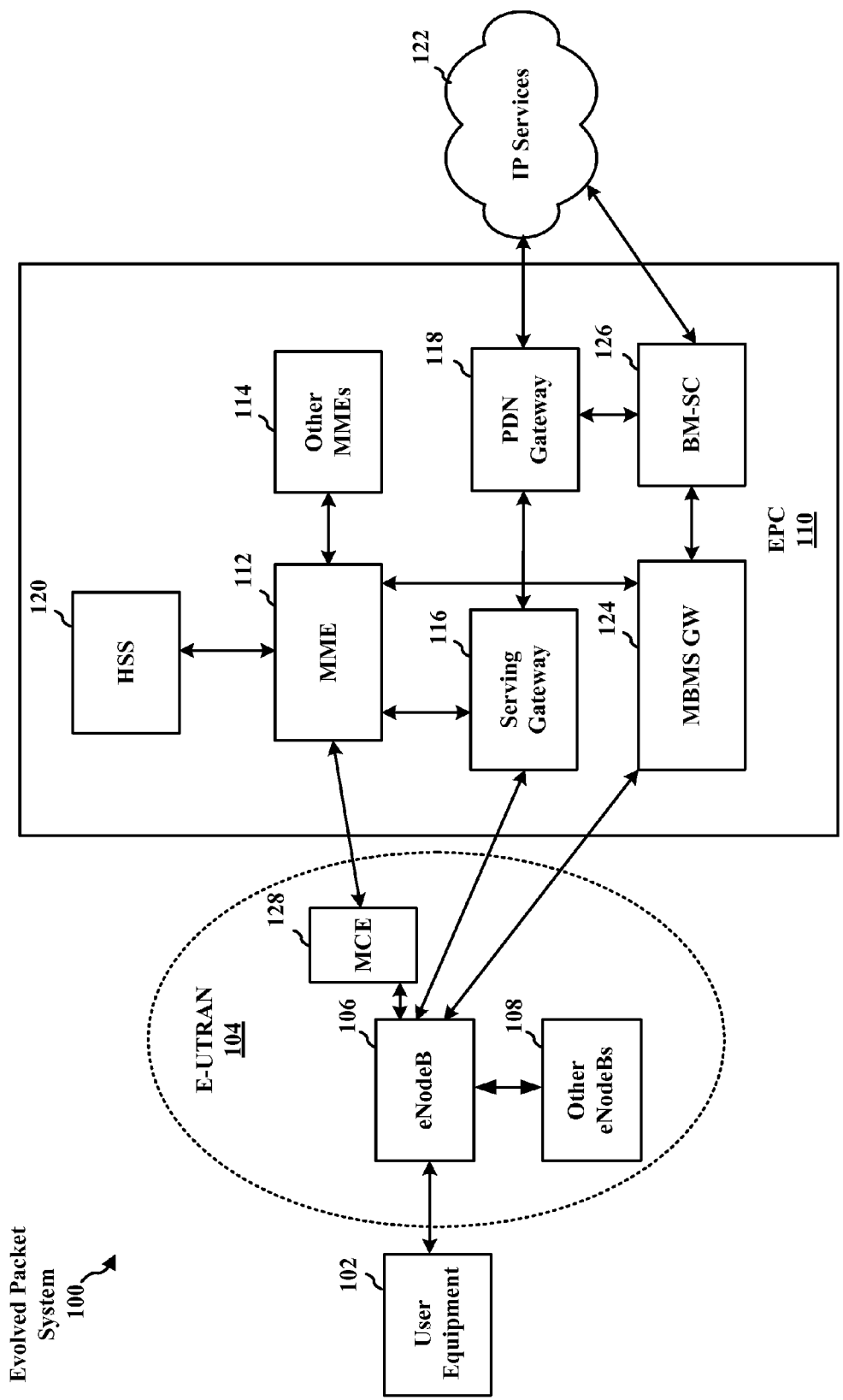
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, operations, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets may be transferred through the Serving Gateway 116, which is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
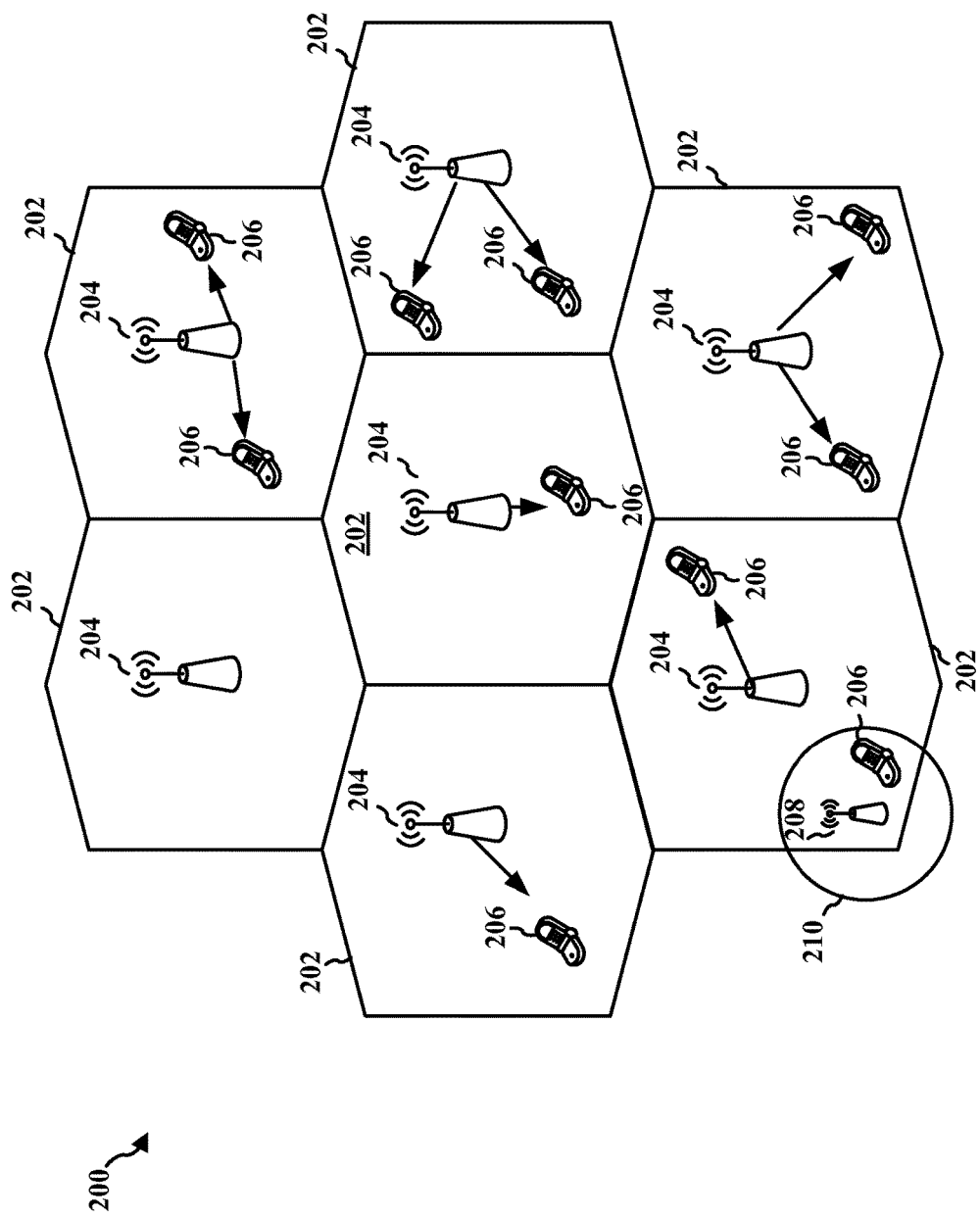
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area depending on the context in which the term is used. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
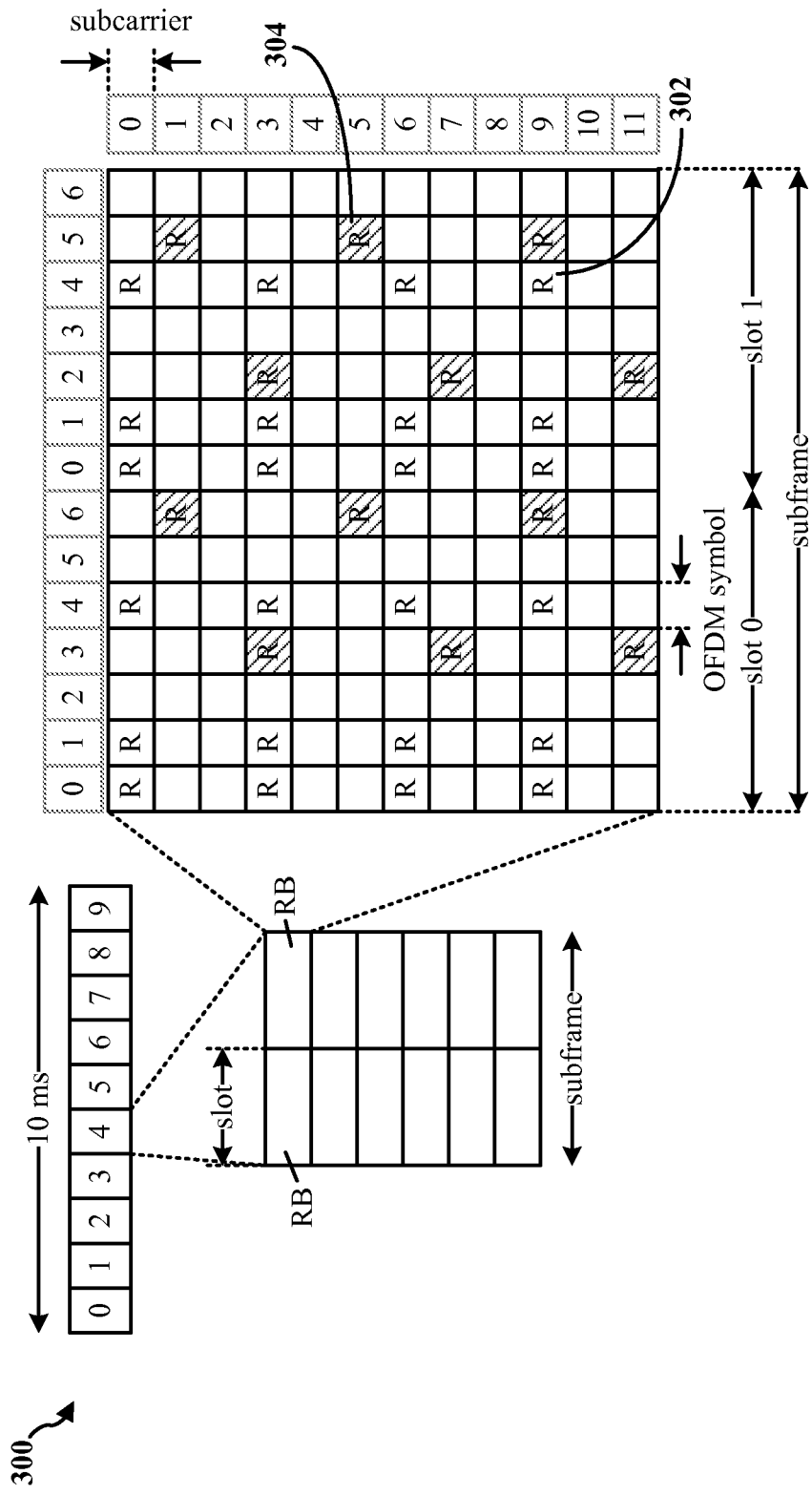
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block may contain 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
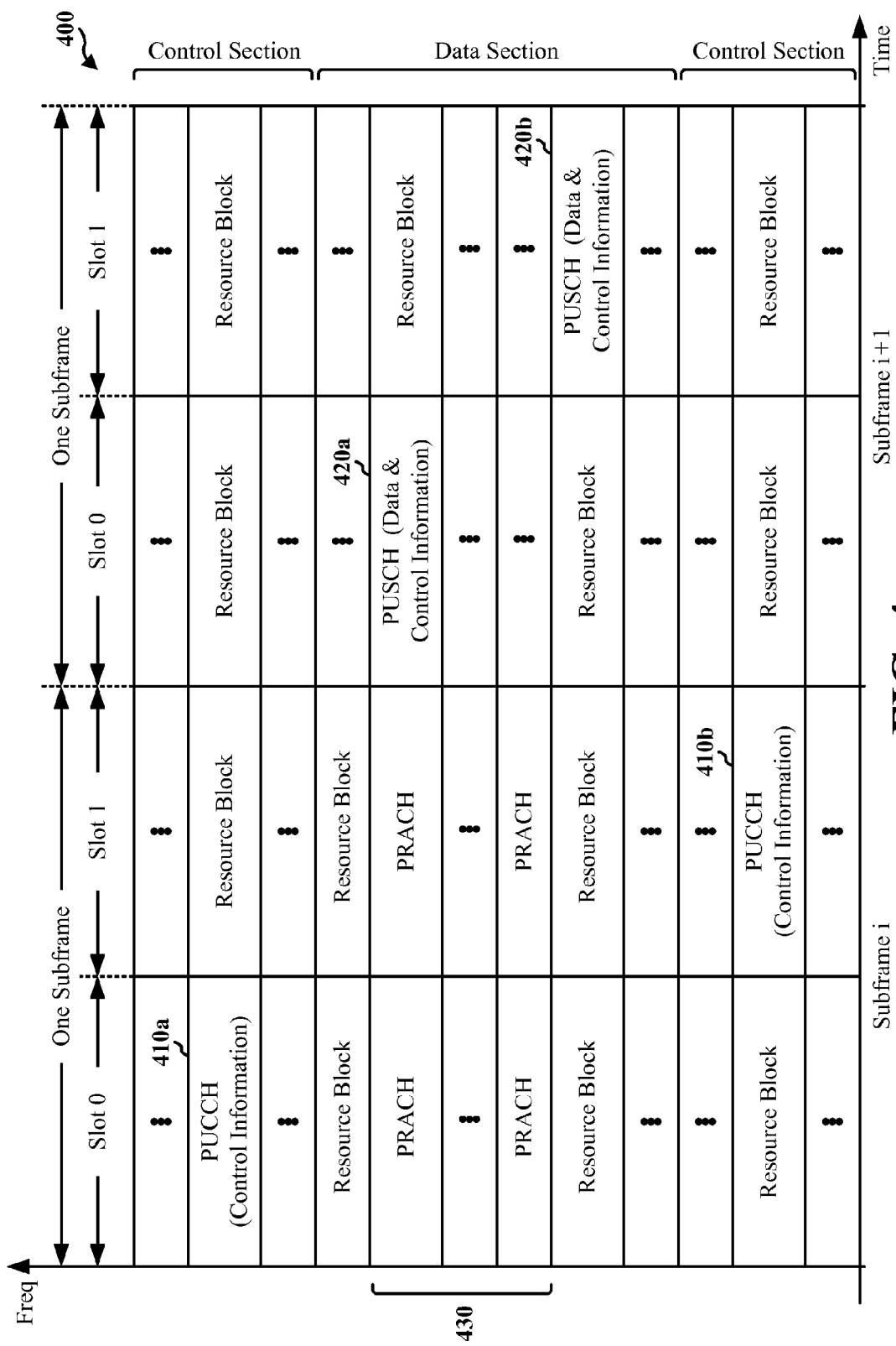
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
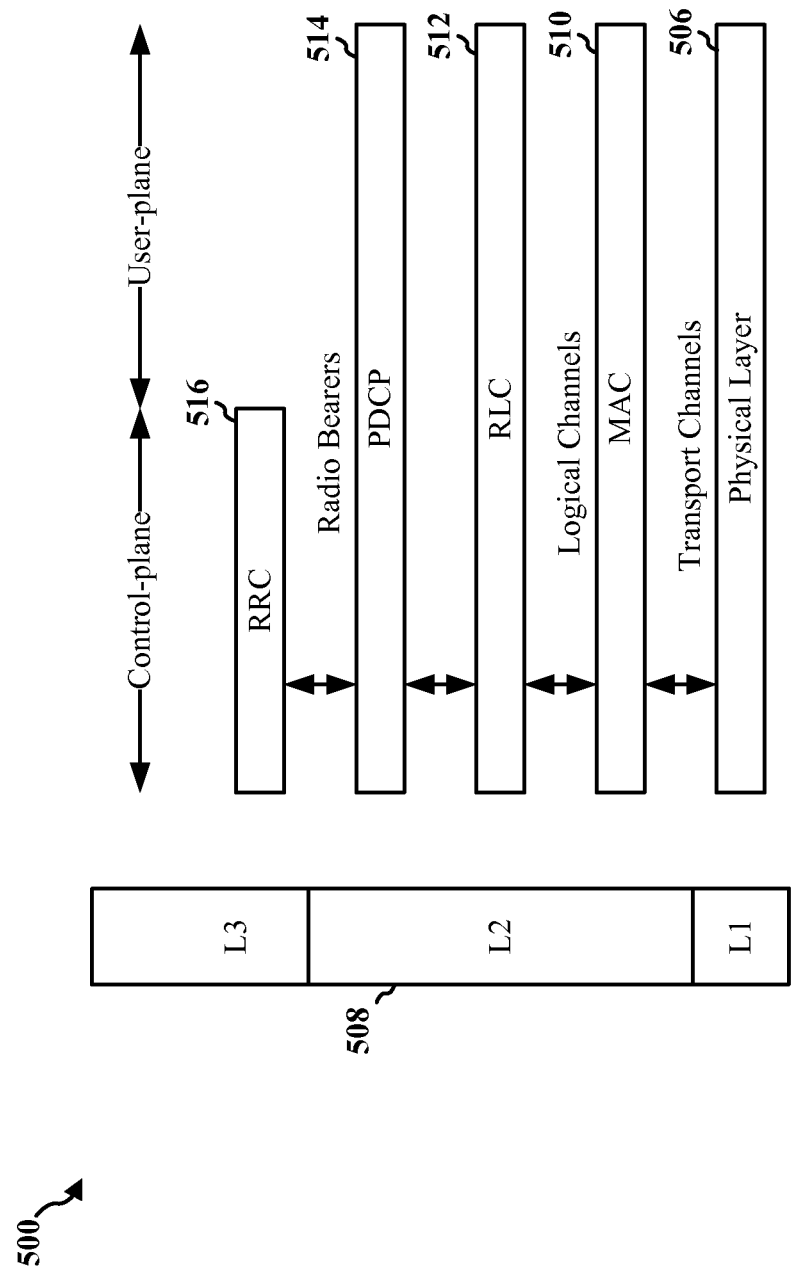
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
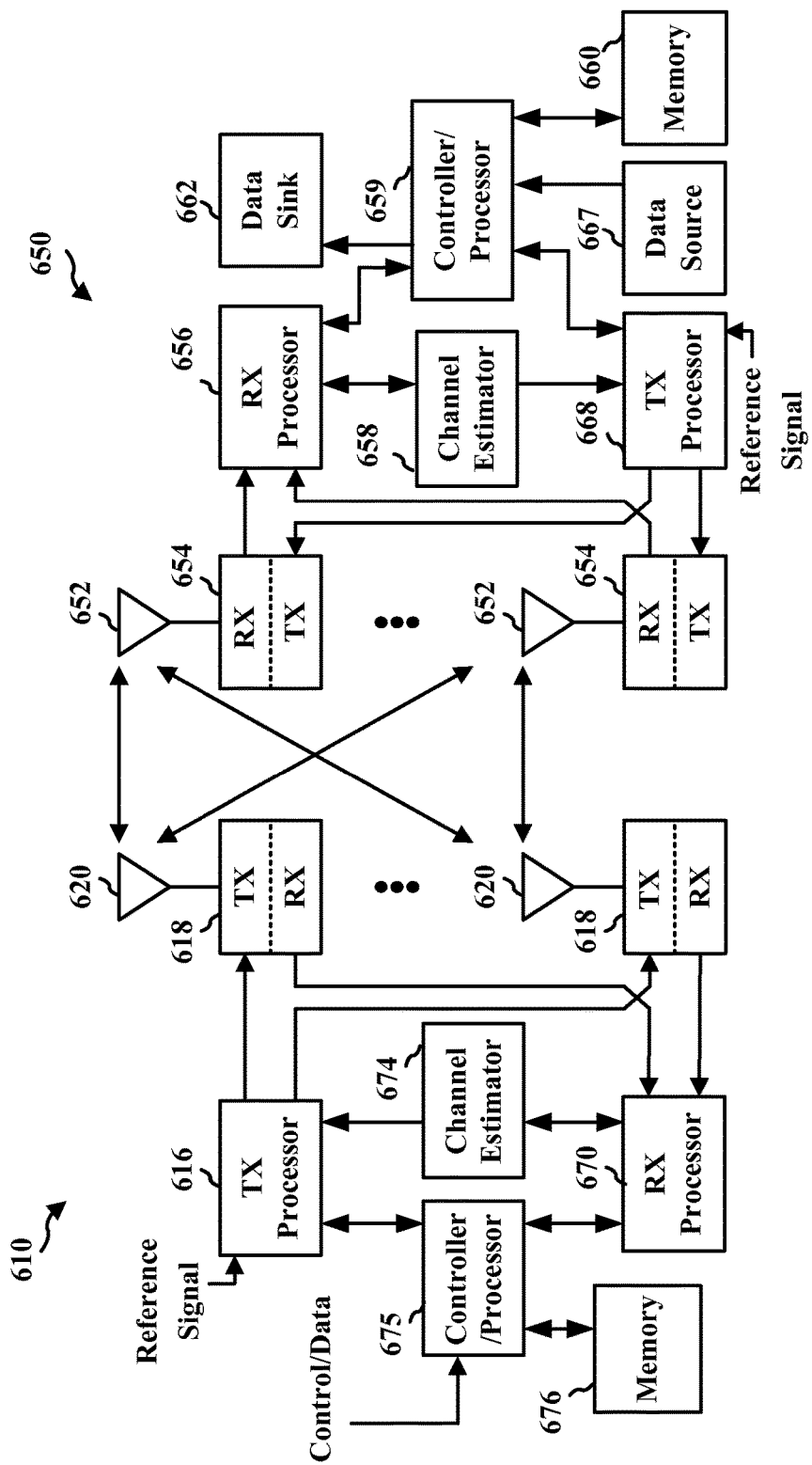
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer.

Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
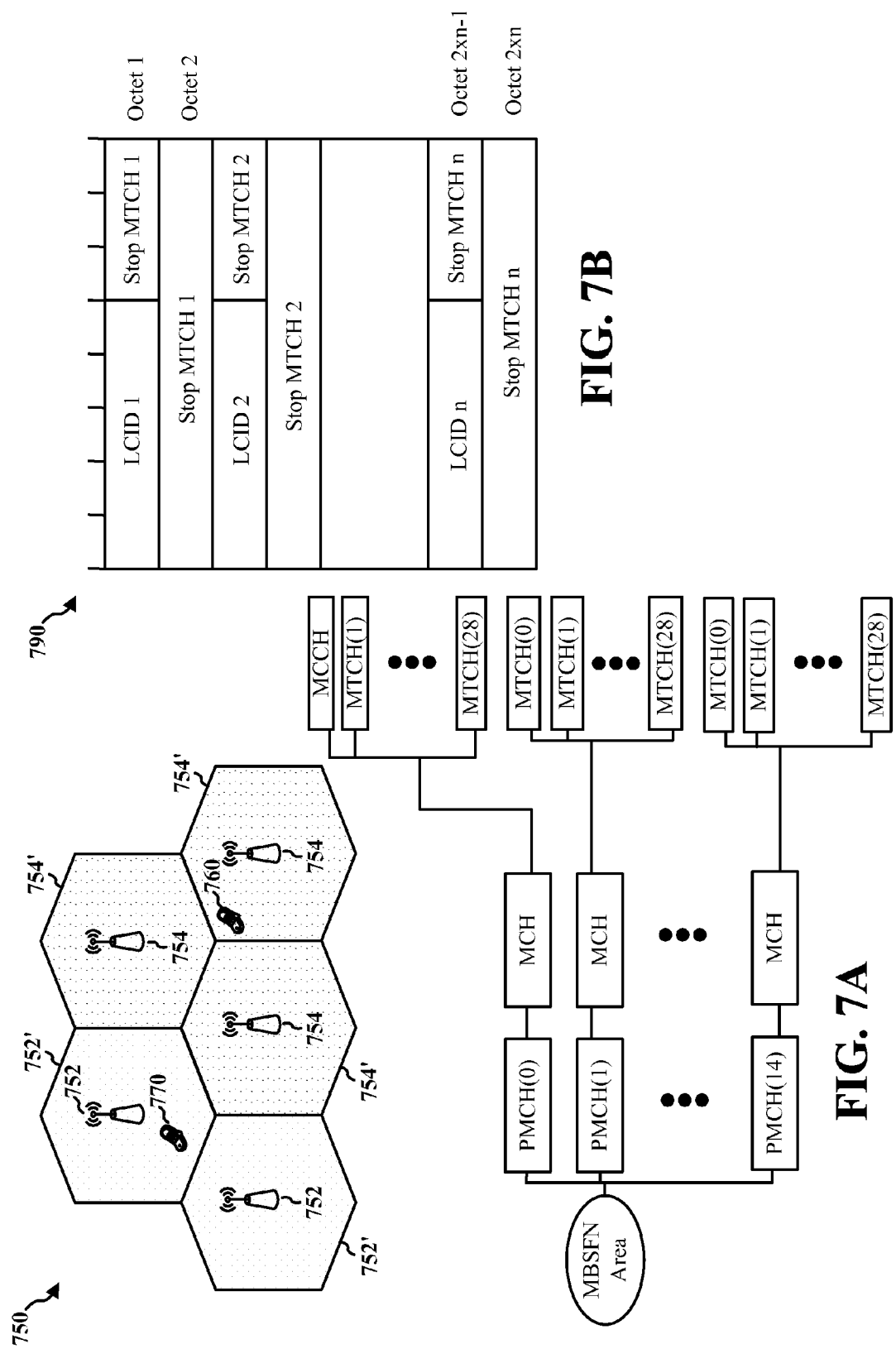
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first operation, the UE may acquire a system information block (SIB) 13 (SIB13). In a second operation, based on the SIB13, the UE may acquire an MBSFN Area Configuration message on an MCCH. In a third operation, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. The TMGI uniquely identifies an eMBMS bearer service. A single globally unique TMGI may be allocated by the BM-SC per MBMS bearer service.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Mobility procedures for MBMS reception allow the UE to start or continue receiving MBMS service(s) via MBSFN when the UE changes cell(s). E-UTRAN procedures provide support for service continuity with respect to mobility of the UE within the same MBSFN area. Within the same geographic area, MBMS services can be provided on more than one frequency. Frequencies that are used to provide MBMS services may change from one geographic area to another within a PLMN. UEs that are receiving MBMS service(s) in an RRC-idle state (RRC_IDLE state) performing cell reselection, or are in an RRC-connected state (RRC_CONNECTED state) obtain target cell MTCH information from the target cell MCCH.

To avoid a need to read MBMS-related system information and/or MCCH on neighbor frequencies of neighboring cells, the UE may be provided with MBMS assistance information such as a user service description (USD) such that the UE can be made aware of which frequency provides which MBMS services via MBSFN. Generally, the BM-SC 126 of the EPC 110 provides the USD to the UE. In the USD (as described in 3GPP TS 26.346, version 11.08), for each MBMS service, the application/service layer provides the TMGI for the MBMS service, a session schedule that includes one or more session start times, and corresponding session end times, frequencies and MBMS service area identities (SAIs) (as described in section 15.3 of 3GPP TS 23.003, version 11.08) belonging to the MBMS service area. For simplicity, it is assumed that a service is carried by a single bearer. The present disclosure is also applicable to multiple bearers (i.e. potentially multiple FLUTE sessions) per service as long as all the services are carried over the same carrier.

As previously stated, a TMGI uniquely identifies an eMBMS bearer service. A single globally unique TMGI may be allocated by the BM-SC per MBMS bearer service. The USD allows the mapping of services to TMGI bearers to be activated to receive the data broadcast for the service. The USD also indicates to the UE the list of SAIs identifying the service areas offering the bearers (TMGIs) associated with the service. Note that in eMBMS and at a first level, a service area is defined as a set of SAIs; this mapping allows a network operator to indicate the set of SAIs that carry a service. At a second level, each cell in the network is configured with the set of SAIs that it supports; this mapping allows the network infrastructure to determine which content must be carried on each cell based on the SAI lists provided by the operator for each service. Each MBMS service is also associated with a list of frequencies for the service based on the frequencies of the cells configured with the SAIs that identify the service areas for the service. For example, one SAI may identify a service area of the entire U.S. (a national coverage area) and another SAI may identify a service area of one city (a local coverage area). The USD may indicate one or more frequencies and one or more SAIs associated with each frequency for a particular service. The frequency information is included as a legacy information for LTE Release 9 devices that do not understand the SAI related information in both the USD and in SIB15. The USD may include information for several services. When a user chooses a service, the UE attempts to activate the reception of data on the eMBMS bearer identified by the corresponding TMGI at the MAC layer.

While a UE interested in a service identified by a TMGI may use a USD to determine which SAIs provide the TMGI, the information included in the USD, is at a global level and is not associated with specific areas. For example, when a USD indicates that SAI1 is associated with frequency F1, this does not mean that SAI1 is available on F1 everywhere in the network. SAI1 is likely used for a regional area. When the UE is outside the regional area, the SAI would not be available even through a cell is on F1. Furthermore, when a USD indicates that SAI1 is associated with frequencies F1 and F2, this does not mean that SAI1 is available on F1 and F2 everywhere in the network. SAI1 may be carried on F1 on some parts of the network and on F2 in some other parts of the network.

Thus, a UE should be provided with additional information for use in service activation. SIB15 information is localized to the surrounding area in which the UE is located, and thus provides a more detailed granularity for the SAI information provided by a USD. Information included in the USD and the SIB15 may be used to determine what service (s) or TMGI(s) are supported by a particular service area on a particular frequency in the adjacent area to the current cell.

The SIB15 mapping of SAIs to frequencies is not sufficient for indicating SAI availability at a cell granularity. For example, the SIB15 broadcast by the current serving cell may include SAI information for a particular neighbor frequency that is a union of all SAI information of the neighboring cells on that frequency. This is not sufficient for the UE to know which exact neighboring cells on that frequency is associated with each SAI. As such, a neighboring cell on a particular frequency may not offer a SAI associated with that frequency even though the SIB15 information indicates that the SAI is available on the frequency. On switching to the neighbor frequency to receive a TMGI carried by a particular SAI, the UE may end up in a cell that is not configured for that particular SAI and thus, does not carry the desired TMGI.

Figure 8:
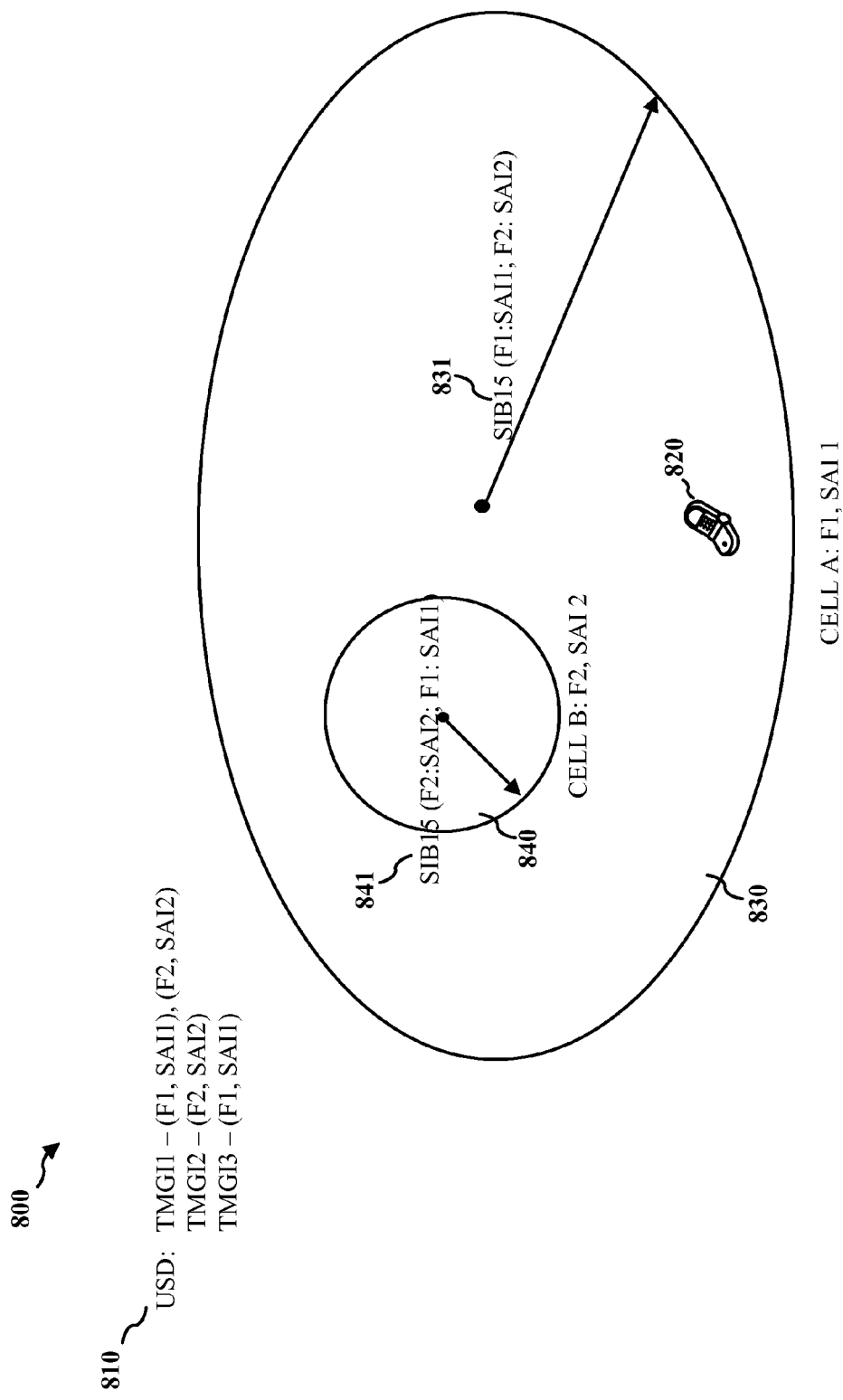
FIG. 8 is a diagram illustrating uses of a user service description (USD) and a system information block (SIB) message in a simple two cell example.

FIG. 8 is a diagram 800 illustrating an example of information provided in the USD and the SIB in a simple two cell example. According to the example, the USD 810 is provided to the UE 820 via the MBMS and includes TMGI1, TMGI2, and TMGI3. The USD 810 may be provided via unicast or broadcast. TMGI1 is available in both Service Area Identity 1 (SAI1) on frequency 1 (F1) and Service Area Identity 2 (SAI2) on frequency 2 (F2). TMGI2 is available in SAI2 on F2. TMGI3 is available in SAI1 on F1. The macro cell A 830 and the pico cell B 830 offer eMBMS services, on the intra-frequency F1 and/or the inter-frequency F2 respectively. Macro cell A 830 on serving frequency F1 is associated with SAI1. The macro cell A 830 broadcasts a SIB15 831 that indicates the intra-frequency F1 with its associated Service Area Identity SAI1, and the neighbor inter-frequency F2 with its associated Service Area Identity SAI2. The neighbor inter-frequency F2 of the macro cell A 830 is the serving frequency F2 of Pico cell B 840 that is a neighbor of cell A 830. Pico cell B is associated with SAI2 with the serving frequency F2. Pico cell B 840 broadcasts SIB15 841 which indicates the intra-frequency F2 with SAI2, and the neighbor inter-frequency F1 with SAI1. In the example of FIG. 8, the UE 820 is within the coverage of cell A 830. Thus, the UE 820 receives from cell A SIB15 831, which includes (F1: SAI1; F2: SAI2).

SIB15 includes a list of SAIs associated with the current cell and the intra-frequency neighbors of the current cell, a list of inter-frequency identifiers that are different than the current cell's frequency identifier, and corresponding lists of SAIs associated with each inter-frequency identifier. The intra- and inter-frequency identifiers are the EARFCN (EU-TRA Absolute Radio Frequency Channel) of the frequency and unambiguously identifies the central frequency of the carrier on which a cell is broadcasting. Thus, SIB15 may be expressed as SIB15 (intra-frequency: SAI1, SAI2, . . . , inter-frequency 1: SAI1, SAI2, . . . , inter-frequency 2: SAI1, SAI2, . . . , inter-frequency n: SAI1, SAI2, . . . ). In the example in FIG. 8, the cell A SIB15 831 includes an intra-frequency F1 and SAI list (F1: SAI1), and an inter-frequency F2 and SAI list (F2: SAI2). It should be noted that the list of SAIs for a frequency may be null when that frequency does not carry eMBMS service. Alternatively, the frequency may be omitted when not associated with any SAIs.

In a case where a current cell on which the UE is camped and one or more neighboring cells of the current cell transmit at the same frequency, there is an intra-frequency neighbor but there may not be an inter-frequency neighbor. In this case, SIB15 of a cell may include only an intra-frequency SAI list. Thus, SIB15 may be expressed as SIB15 (intra-frequency SAI list) or SIB15 (intra-frequency: SAI1, SAI2, . . . ). It is noted that the intra-frequency SAI list may include one or more SAIs associated with the current cell the UE is camped on as well as one or more SAIs associated with neighboring cell(s) on the same frequency. For example, if a current cell and a neighboring cell transmit at frequency F1, and the current cell is associated with SAI1 and the neighboring cell is associated with SAI2, SIB15 of the current cell may be expressed as SIB15 (F1: SAI1, SAI2). Thus, SIB15 may include an intra-frequency SAI list having the intra-frequency F1 and SAI1 associated with the current cell and SAI2 associated with the neighboring cell. An alternative is for the SIB15 to include only the SAIs broadcast on the serving cell in the intra-frequency SAI list.

As previously mentioned, SIB15 information is more localized to the surrounding area the UE is in, and thus may provide more granularity for SAI information than provided by a USD. The SIB15 information, however, is not at a cell granularity. Accordingly, the information provided by SIB15, as specified under current 3GPP standards, has an inherent coarseness in that a SAI included in the intra-frequency SAI list and/or the inter-frequency SAI list is not associated with particular neighboring cells. Several issues may arise from this coarseness, as described below under scenarios A, B and C.

Figure 9:
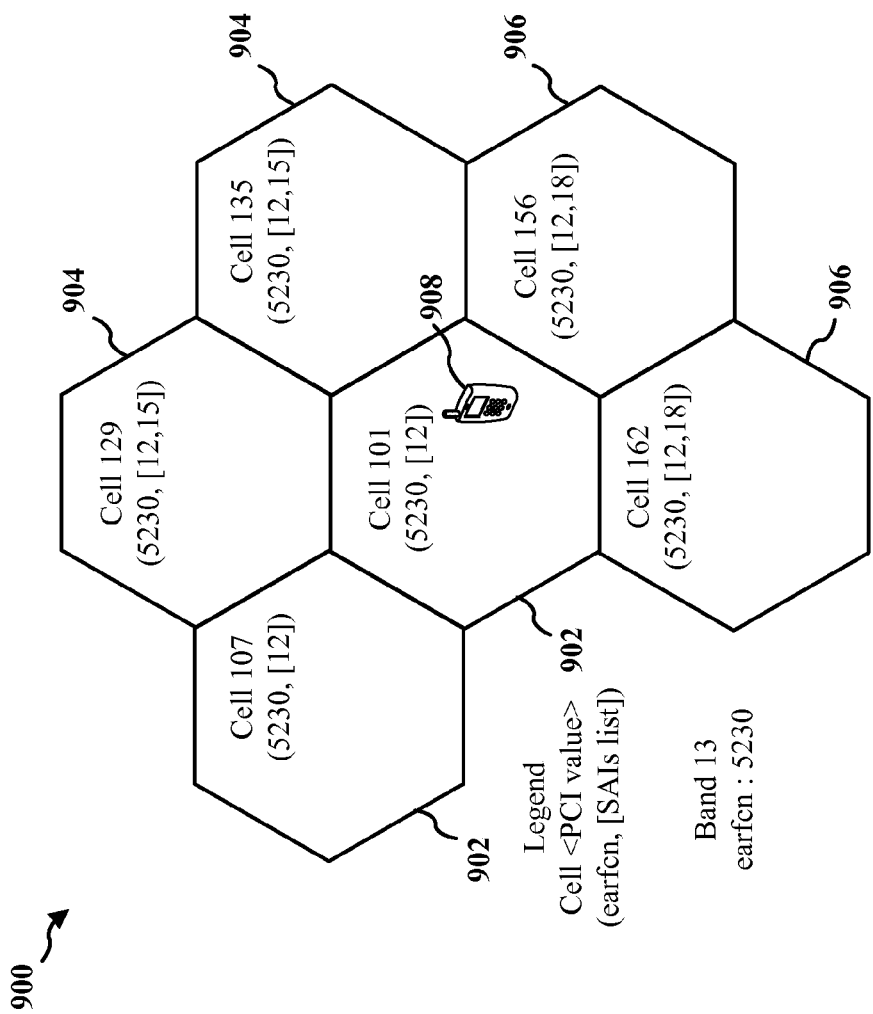
FIG. 9 is an illustration of intra-frequency cells, including cell groupings having different associated service area identities (SAIs).

Scenario A: Intra-frequency neighboring cells serving different sets of SAIs:

FIG. 9 is an illustration 900 of intra-frequency cells, including cell groupings having different associated SAIs. A first cell group 902 includes Cell 107 and Cell 101, each of which has an associated SAI list: 12. A second cell group 904 includes Cell 129 and Cell 135, each of which has an associated SAI list: 12, 15. A third cell group 906 includes Cell 162 and Cell 156, each of which has an associated SAI list: 12, 18.

In an example scenario, a UE 908 camped on Cell 101 detects Cells 107, 129, 135, 156 and 162 as neighboring cells. Currently, the SIB15 of the serving cell (e.g., Cell 101) may include intra-frequency SAI information that is the union of the SAIs of which the serving cell (e.g., Cell 101) is a member and the SAIs that each of the intra-frequency neighboring cells (e.g., Cells 107, 129, 135, 156 and 162) is a member. In this example scenario, the SIB15 of the serving cell includes an intra-frequency SAI list=[12, 15, 18]. There is, however, no precise mapping of the SAIs in the list to neighboring cells that are associated with each of the SAIs. In other words, SIB15 does not indicate that SAI15 is available on Cell 129 and Cell 135 and that SAI18 is available on Cell 156 and Cell 162. Accordingly, a hit-or-miss condition may arise, wherein the UE 908 may present to the user an option to select any of the three SAIs in the list included in SIB15, even though the UE is camped on Cell 101 that is associated only with SAI12. If the UE tries to activate a TMGI which is associated with a SAI other than SAI12, such as SAI15 or SAI18 the UE modem will fail the service activation for that TMGI.

A UE may compare service availability per the USD/SIB15 method to the list of TMGIs actually available in the cell. However, this method adds additional complexity to the device implementation and is unreliable when a) services are currently not being broadcast (future services), or when services are not being broadcast based on a counting procedure (e.g., based on the counting procedure there are not enough users in the cell to justify broadcasting the service).

Figure 10:
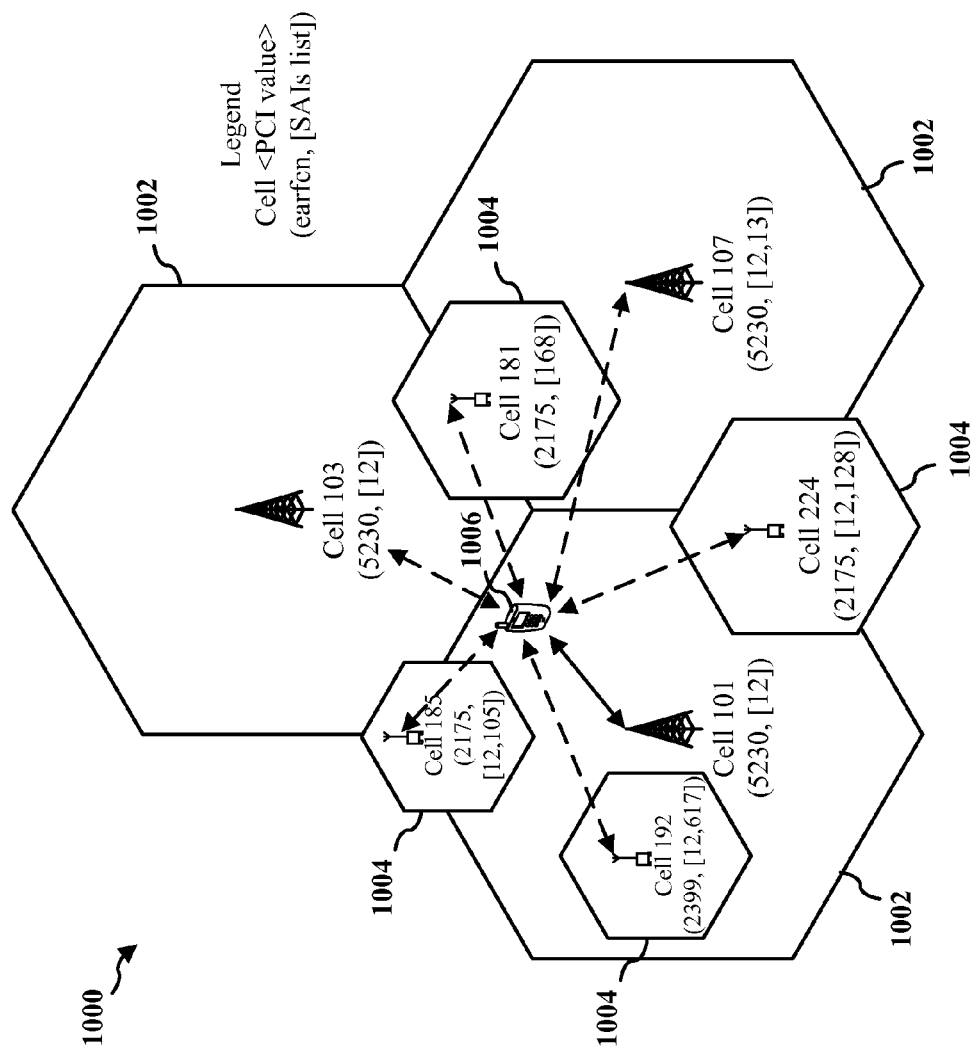
FIG. 10 is an illustration of macro cells and micro cells forming intra-frequency and inter-frequency relationships.

Scenario B: Inter-frequency neighboring cells which serve different SAIs (e.g., multiple venue deployment in a localized network):

FIG. 10 is an illustration 1000 of macro cells 1002 and micro cells 1004 with certain intra-frequency and inter-frequency relationships. Cell 101, Cell 107 and Cell 103 are intra-frequency neighboring cells on a first frequency (e.g., EUTRA absolute radio frequency channel number (earfcn) 5230). Cell 181, Cell 185 and Cell 224 are intra-frequency neighboring cells on a second frequency (e.g., earfcn 2175). Cell 192 is an inter-frequency neighboring cell on a third frequency (e.g., earfcn 2399).

In an example scenario, a UE 1006 camped on Cell 101 may detect Cells 107, 103, 192, 185, 181 and 224 as neighboring cells. With respect to Cell 101, Cells 192, 185, 181 and 224 are inter-frequency neighboring cells. Currently, the SIB15 transmitted by the serving cell (e.g., Cell 101) includes intra-frequency SAI information that includes the SAIs that the serving cell is associated with and may include the SAIs associated with the intra-frequency neighboring cells on earfcn 5230. SIB 15 also includes inter-frequency SAI information for each inter-frequency (earfcn 2175 and 2399). The SAI list for each inter-frequency is the union of the SAIs of each inter-frequency neighboring cell on the particular inter-frequency. In this example scenario, the SIB15 of the serving cell (e.g., Cell 101) indicates an inter-frequency SAI list=[12, 105, 129, 168] corresponding to Cell 101 inter-frequency earfcn 2175 and an inter-frequency SAI list=[12, 617] corresponding to Cell 101 inter-frequency earfcn 2399. There, however, is no precise mapping between the SAIs in the list to corresponding neighboring cells belonging to each SAI. In other words, SIB15 does not indicate that Cell 185, Cell 192 and Cell 224 associate with SAI12, that Cell 185 also associates with SAI105, that Cell 224 also associates with SAI128, and that Cell 181 only associates with SAI168.

Figure 11:
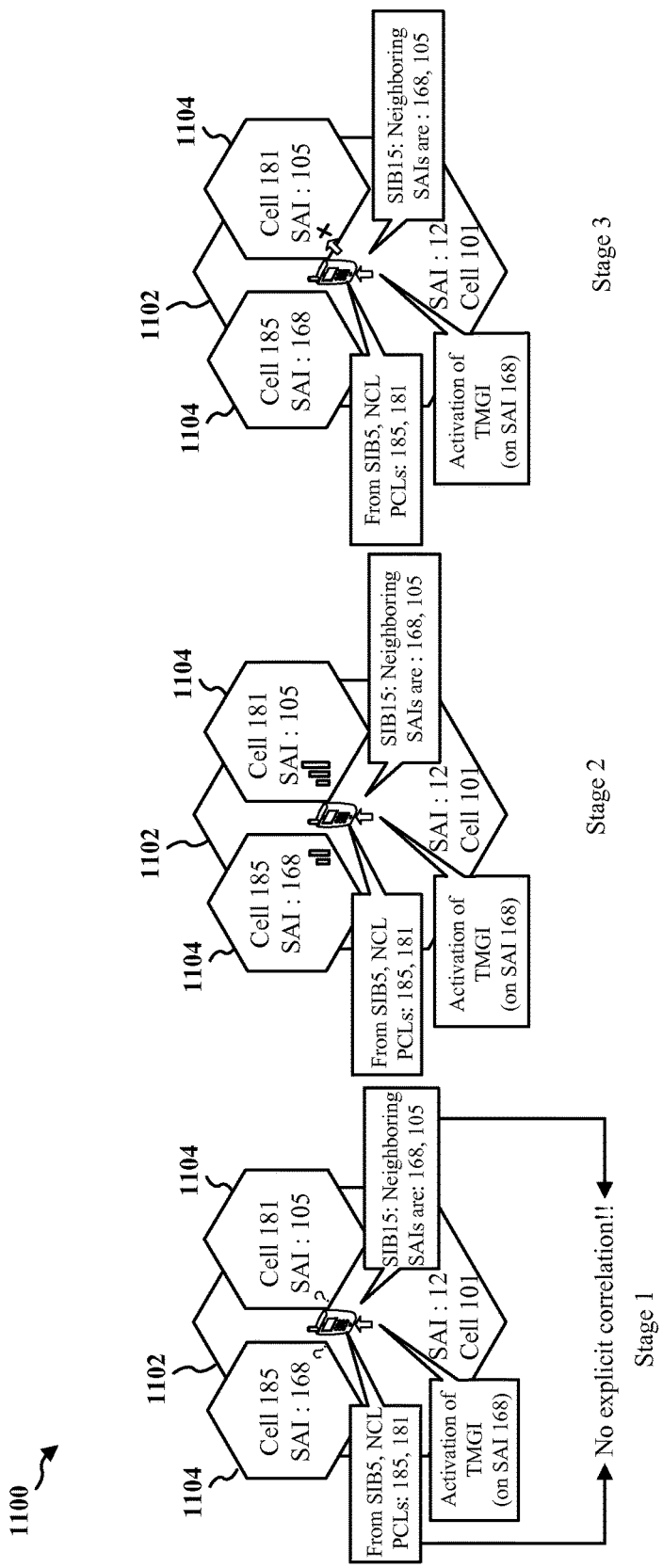
FIG. 11 is an illustration of a hit-or-miss condition between a serving cell and neighboring cells that may result from the lack of precise mapping in SIB15.

FIG. 11 is an illustration 1100 of a hit-or-miss condition that may occur between a serving cell 1102 on frequency F1 and neighboring cells 1104 on frequency F2 as a result of the lack of precise mapping of neighboring cell(s) to SAI information in SIB15. In this case, the cells may belong to different SAI(s). Initially, at stage 1, a UE camped on serving Cell 101 detects Cell 181 and Cell 185 as inter-frequency neighboring cells on frequency F2, thus establishing a neighboring cell list (NCL) indicating Cell 181, 185. The UE receives a SIB15 from serving Cell 1 indicating that the inter-frequency F2 has a SAI list of SAI105 and SAI168.

Then at stage 2 the UE decides to activate a service identified by a TMGI that is only associated with SAI168. The lack of precise mapping of SAIs to cells in SIB15 may result in the UE switching frequencies to a cell that does not provide the service of interest because the UE may assume both Cell 181 and Cell 185 are associated with SAI168. Accordingly, at stage 3, the UE attempts to activate the selected service through cell reselection based on signal strength, such as reference signal received power (RSRP). In this example, the signal strength of Cell 181 is greater than the signal strength of Cell 185. The UE thus reselects to Cell 181, which does not provide the selected service.

Figure 12:
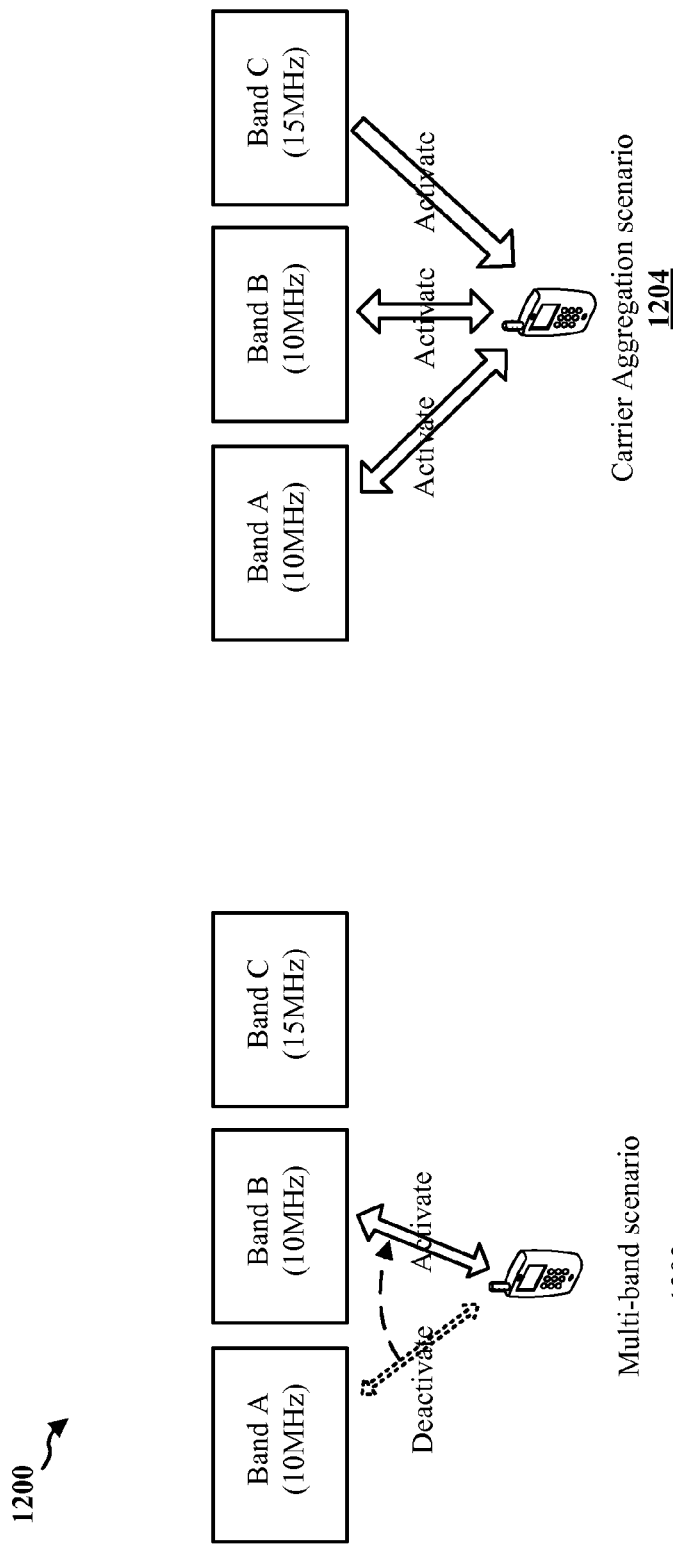
FIG. 12 is an illustration of multi-band service.

Scenario C: Concurrent service bearers across multiple frequencies (if carrier aggregation (CA) is supported):

FIG. 12 is an illustration 1200 of multi-band service. In the current multi-band scenario 1202, eMBMS supports multi-band services via cell reselection/handover. In this scenario, the UE deactivates a service by deactivating an eMBMS bearer with a first carrier frequency (e.g., Band A) in order to activate another service through an eMBMS bearer activation with a second carrier frequency (e.g., Band B). Current standards do not provide for concurrent activation of two eMBMS bearers on two different frequencies. In a carrier aggregation scenario 1204, the UE may activate a service provided on at least one of Band A, Band B and Band C. As an example, to support a multiple view service, e.g., concurrent RealTime DASH streaming services, an eMBMS application could enable two TMGIs from two different frequencies concurrently if carrier aggregation is supported. Again, the lack of precise mapping between SAIs and cells, may result in the inability of the UE to achieve accurate service activation when eMBMS is deployed with carrier aggregation.

Disclosed below are various alternatives that address the foregoing issues. These alternatives provide granularity at the cell level by providing information that allows for the identification of specific cells in a neighbor area that carry an SAI of interest. Such granularity may be provided through mapping of SAIs to neighboring cells through existing system information messages, such as SIB15 and one or more of SIB4 and SIB5.

Alternative A1: A bit-mapping mechanism to derive SAI information of eMBMS neighboring cells:

In a first aspect, a bit-mapping mechanism may be used to map SAI information to neighboring cells. In the bit-mapping mechanism one or both of an intra-frequency physical cell identifier (PCI) parameter, and an inter-frequency PCI parameter may be added to SIB15. The intra-frequency parameter may include one or more intra-frequency PCIs. Likewise, the inter-frequency parameter may include one or more inter-frequency PCIs. As described further below through numerous examples, while the mbms-SAI-Intar-Freq-r11 and/or mbms-SAI-InterFreq-r11 information are present in SIB15, additional sets of PCIs of interest may be added with respect to each carrier frequency through one or both of the intra-frequency PCI parameter and the inter-frequency PCI parameter. These sets of PCIs of interest identify the neighboring cells that support the eMBMS cells and SAIs. These parameters provide a mechanism to map or correlate inter-frequency and/or inter-frequency neighboring cell information with their associated SAIs. "Associated" in this context means those SAIs that are supported or served by a particular cell. The mechanism may minimize the overhead on the SIB15 message with a backward compatibility support. The mechanism introduces the concept of a "transposed" SAI index that is derived and included in the SAI list. The transposed SAI includes information, which in combination with other cell information, allows for the mapping of a SAI to one or more neighboring cells associated with the SAI.

FIG. 13 is an example SIB15 1300 with additional intra-frequency and inter-frequency PCI list parameters. The additional PCI list parameters include a mbms-Neighboring-PCI-List-IntraFreq-r12 parameter 1302 for purposes of mapping SAIs to intra-frequency neighboring cells, and one or more mbms-Neighboring-PCI-List-InterFreq-r12 parameters 1304, 1306 for mapping SAIs to one or more respective inter-frequency neighboring cells. Each PCI list parameter 1302, 1304, 1306 is associated with a respective SAI list parameter 1308, 1310, 1312, which in turn is associated with a respective carrier frequency 1314, 1316.

In the example SIB15 of FIG. 13, the mbms-Neighboring-PCI-List-InterFreq-r12 {[y1, y2]} parameter 1304 identifies PCIs for inter-frequency earfcn 2175, while mbms-Neighboring-PCI-List-InterFreq-r12 {[z1, z2]} parameter 1306 identifies PCIs for inter-frequency earfcn 2399. The presence of a PCI list parameter 1302, 1304, 1306 in SIB15 1300 implies that a transposed SAI (e.g., t_SAI_x, t_SAI_y) may be derived and added to the SAI list 1308, 1310, 1312 associated with the PCI list.

Figure 14:
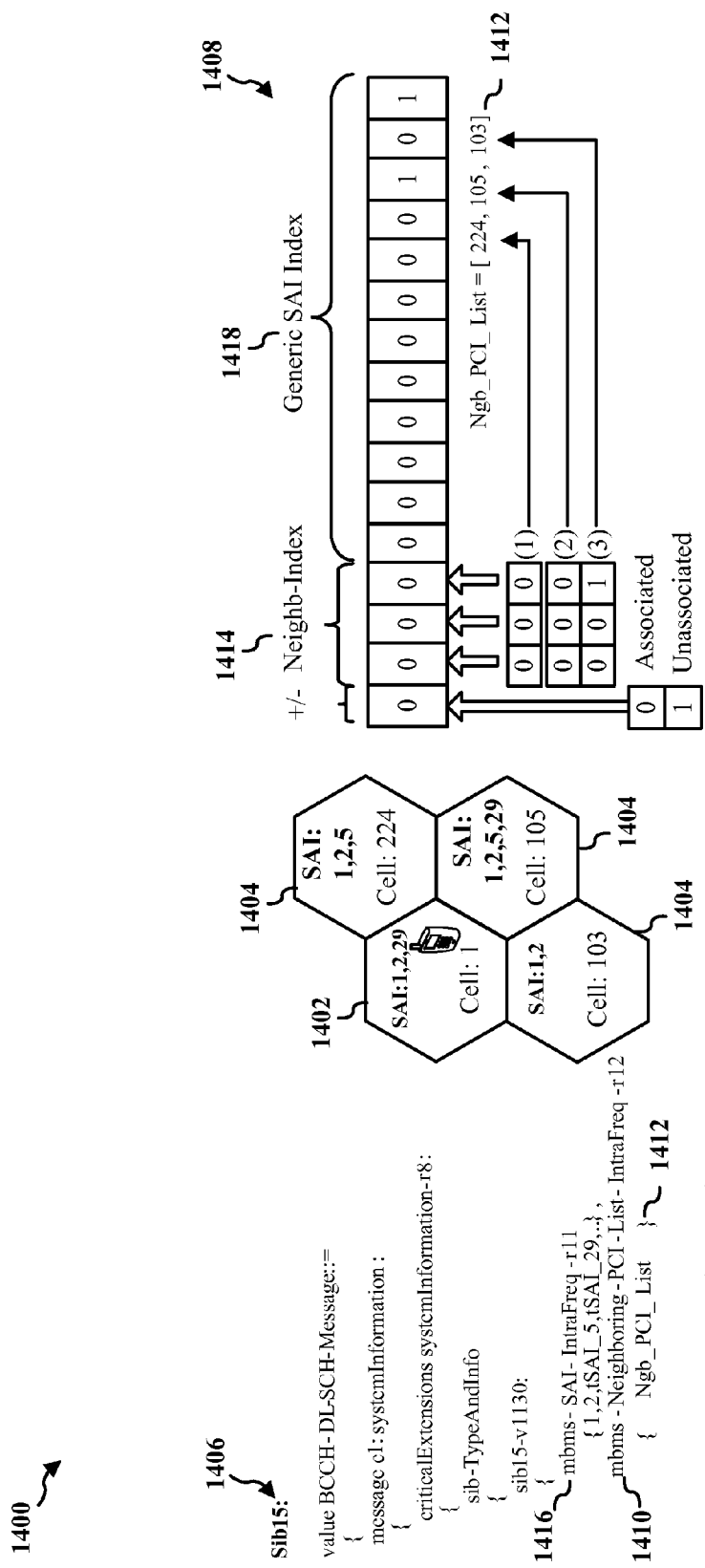
FIG. 14 is an illustration of a serving cell and several intra-frequency neighboring cells, a corresponding SIB15 for the serving cell, and a 16 bit SAI index included in the SIB15.

FIG. 14 is an illustration 1400 of a serving cell 1402 and several intra-frequency neighboring cells 1404, and a corresponding SIB15 1406 for the serving cell. In accordance with the first alternative, a neighboring PCI list 1410 (e.g., mbms-Neighboring-PCI-List-IntraFreq-r12) is present in SIB15, and is populated with a list of neighboring cells (e.g., Ngb_PCI_List) 1412. The SAI index 1408 includes a generic SAI index region 1418 that identifies the SAI. In the SAI index 1408 of FIG. 14, the generic SAI index corresponds to a 12 bit value, which when converted to a decimal value, identifies a particular SAI. For example, the generic SAI index 1418 is 000000000101. This 12 bit value converts to a decimal value 5; thereby identifying SAI5. A few most significant bits (MSB) of the 16 bit SAI index 1408 are reserved as a neighboring cell position index (CPI) 1414. The neighboring CPI index 1414 correlates the SAI identified by the generic SAI index 1418 with PCI information in the Ngb_PCI_List 1412. The neighboring cells listed in the Ngb_PCI_List 1412 are mapped to bits in neighboring CPI index 1414. These bits provide information regarding the availability of the SAI identified by the generic SAI index 1418 in the mapped cell. In one implementation, the neighboring cells listed in Ngb_PCI_List 1412 are mapped to bits of the neighboring CPI index 1414 based on the order the cells are listed. Examples of this mapping are provided below, with respect to FIG. 15 and FIG. 16.

The number of MSB bits reserved in the SAI index 1408 for the neighboring cell list 1414 may be the number of neighboring cells plus 1. In the example of FIG. 14, the serving cell Cell 1 has three neighboring cells: Cell 105, Cell 103 and Cell 224. Accordingly, the neighboring PCI list 1410 for the serving cell Cell 1 is Ngb_PCI_List=[224, 105, 103]. Because there are three neighboring cells in the list, there are four MSB bits reserved for PCI-to-SAI mapping. Each of the neighboring three cells is associated with one of the bits and the value of a bit indicates whether the associated cell supports the particular SAI. The fourth bit is a self-association bit that indicates whether the particular SAI is supported by the intra-frequency SAI list of the serving cell or not. If the self-association bit is set to "0" for the particular SAI, the SAI is associated to the serving cell. If the self-association bit is set to "1", then the particular SAI is not associated/supported by the serving cell. A neighboring CPI index 1414 wherein all bits are "0" implies that all SAIs in the intra-frequency SAI list 1416 are supported by the neighboring cells. In other words, the transposed SAI becomes the generic SAI that is listed in the USD. This provides backward compatibility for networks that may not support the bit-mapping mechanisms disclosed herein.

Regarding bit values described above and further below, the general concept is to use bit-mapping to correlate the SAI with PCI. Hence, the scheme is not limited to the examples provided herein. For example, while bit "0" may be used to indicate an association between and SAI and a serving cell, and bit "1" is used to indicate an absence of such association, the respective meanings of bit "0" and bit "1" may be reversed. Furthermore, a flag with T or F setting may be used to convey such information.

Figure 15:
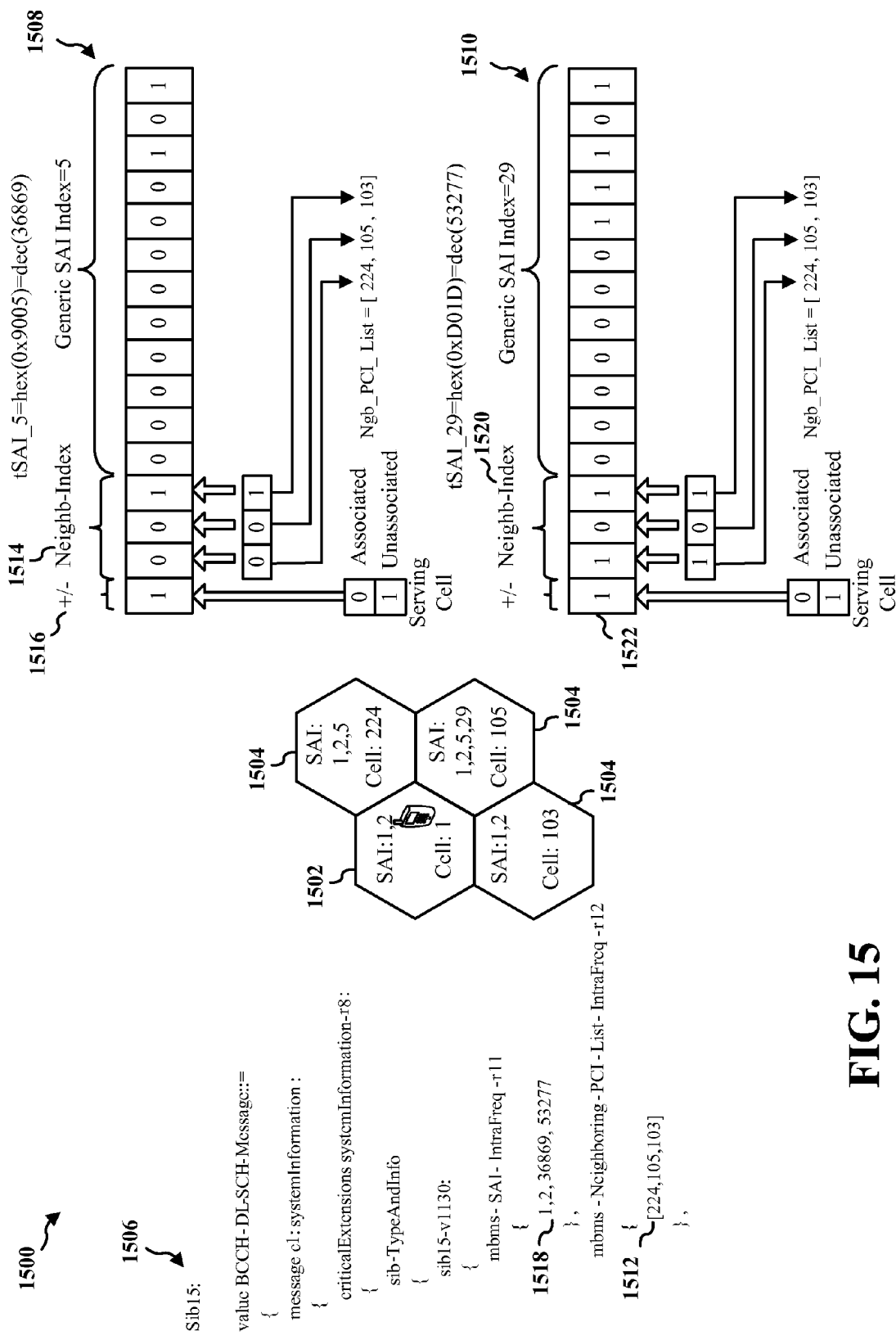
FIG. 15 and FIG. 16 are illustrations of a serving cell and several intra-frequency neighboring cells, a corresponding SIB15 for the serving cell, a transposed SAI5 index, and a transposed SAI29 index.

FIG. 15 is an illustration 1500 of a serving cell 1502 and several intra-frequency neighboring cells 1504, a corresponding SIB15 1506 for the serving cell, a transposed SAI5 index 1508, and a transposed SAI29 index 1510. Cell 1 supports SAI1 and SAI2. Cell 103 supports SAI1 and SAI2. Cell 224 supports SAI1, SAI2 and SAI5. Cell 105 supports SAI1, SAI2, SAI5 and SAI29. In this example, a UE is camped on Cell 1, and the SIB15 1506 the UE receives from Cell 1 includes a neighboring intra-frequency cell list 1512, Ngb_PCI_List=[224, 105, 103].

In order to convey to the UE, the mapping of SAI5 to neighboring cells, the SAI5 index 1508 may be formatted as a transposed SAI that includes the generic SAI index for SAI5, a neighboring CPI index 1514 defined by three bits, and a self-association bit 1516. Each of the three bits of the neighboring CPI index 1514 corresponds to a respective one of the neighboring cells listed in the Ngb_PCI_List. The value (e.g., 0 or 1) of the bit serves as an indication as to whether the neighboring cell associated with the bit supports the particular SAI. In this example, the bit value associated with Cell 103 is "1" because Cell 103 does not support SAI5; the bit value associated with Cell 105 is "0" because Cell 105 does support SAI5; and the bit value associated with Cell 224 is "0" because Cell 224 does support SAI5. The self-association bit 1516 is "1" because the serving cell Cell 1 does not support SAI5. The 16 bit SAI5 index 1508 may be converted into a decimal value (36869) or hexadecimal value, and included in that form in the intra-frequency SAI list 1518 of SIB15.

In order to convey to the UE, the mapping of SAI29 to neighboring cells, the SAI29 index 1510 is formatted as a transposed SAI that includes the generic SAI index for SAI29, a neighboring CPI index 1520 defined by three bits, and a self-association bit 1522. Each of the three bits of the neighboring CPI index 1520 corresponds to a respective one of the neighboring cells listed in the Ngb_PCI_List. The value (e.g., 0 or 1) of the bit serves as an indication as to whether the neighboring cell associated with the bit supports the particular SAI. In this example, the bit value associated with Cell 103 is "1" because Cell 103 does not support SAI29; the bit value associated with Cell 105 is "0" because Cell 105 does support SAI29; and the bit value associated with Cell 224 is "1" Cell 105 does not support SAI29. The self-association bit 1516 is "1" because the serving cell Cell 1 does not support SAI29. The 16 bit SAI29 index 1510 may be converted into a decimal value (53277) or hexadecimal value (0xD01D), and included in that form in the SAI list of SIB15.

The SIB15 1506 includes an intra-frequency SAI list 1518, e.g., SAI_List={1, 2, 36869, 53277}. The "1" and "2" indicate that SAI1 and SAI2 are available on both the serving cell: Cell 1, and the neighboring cells: Cell 105, Cell 103 and Cell 224. The "36869" (e.g., transposed SAI, tSAI_5) in the intra-frequency SAI list 1518 indicates the existence of a SAI that is available on one or more neighboring cells. The "53277" (e.g., transposed SAI, tSAI_29) in the intra-frequency SAI list 1518 indicates the existence of another SAI that is available on one or more neighboring cells.

On the UE side, upon receipt of SIB15, the UE may derive the mapping of SAI to neighboring cells based on the information included in the neighboring intra-frequency cell list 1512 and the intra-frequency SAI list 1518. Based on the format of the information in the intra-frequency SAI list 1518, the UE determines whether an entry on the list corresponds to a transposed SAI. For example, given SAI_List={1, 2, 36869, 53277}, the UE determines that 1 indicates SAI1 is supported by the serving cell Cell 1 and all neighboring cells Cell 105, Cell 103 and Cell 224; and 2 indicates SAI2 is supported by the serving cell Cell 1 and all neighboring cells Cell 105, Cell 103 and Cell 224. The UE determines that each of 36869 and 53277 indicates a transposed SAI, based on the presence of a valid mbms-Neighboring-PCI-List-IntraFreq-r12 parameter in SIB15. Accordingly, the UE converts each of the decimal values to a 16 bit value and derives the SAI and the neighboring cells mapped to the SAI. In the case of transposed SAI value of 36869, the UE converts 36869 to a 16 bit value 1001000000000101 and determines the SAI is SAI5 based on bits 1-12, e.g., the generic SAI index. The UE determines the SAI is SAI5 by converting the generic SAI index 000000000101 to a decimal value, which in this case is 5. The UE further determines, based on bits 13-16, and the order of cells identified in the Ngb_PCI_List=[224, 105, 103], that Cell 103 does not support SAI 5, Cell 105 and Cell 224 do support SAI5, and the serving cell Cell 1 does not support SAI5. From the self-association bit 1516, the UE determines whether SAI5 is supported by the serving cell: Cell 1. In this case, the self-association bit 1516 value "1" indicates SAI5 is not supported by the serving cell.

In the case of transposed SAI value of 53277, the UE converts 53277 to a 16 bit value 1101000000011101 and determines the SAI is SAI29 based on bits 1-12, e.g., the generic SAI index. The UE determines the SAI is SAI29 by converting the generic SAI index 000000011101 to a decimal value, which in this case is 29. The UE further determines, based on bits 13-16, and the order of cells identified in the Ngb_PCI_List=[224, 105, 103], that neighboring cells: Cell 103 and Cell 224 do not support SAI 29, neighboring cell: Cell 105 does support SAI29, and the serving cell: Cell 1 does not support SAI29. The latter is determined based on the self-association bit 1516, wherein the value "1" indicates SAI29 is not supported by the serving cell.

Figure 16:
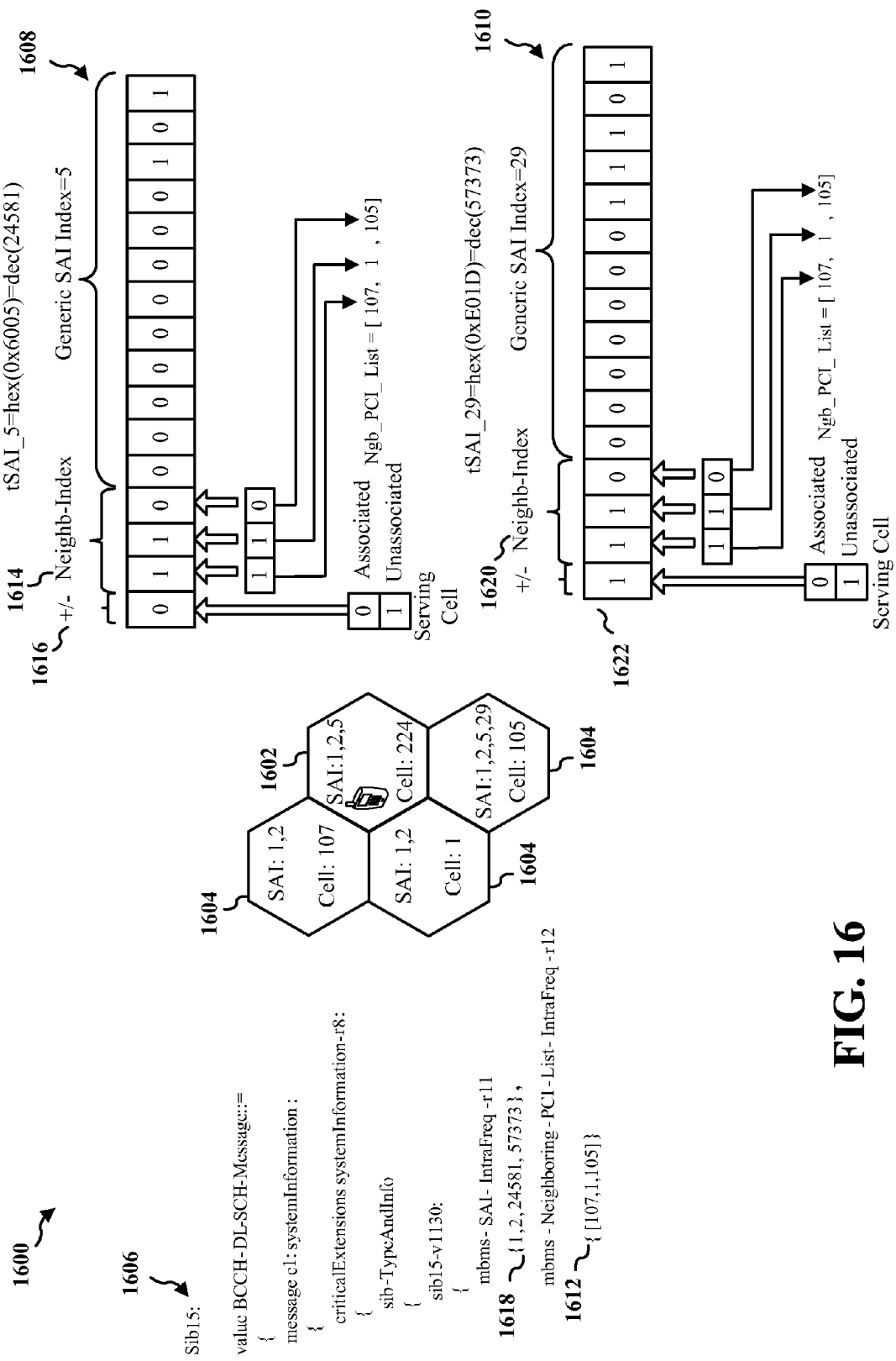

FIG. 16 is an illustration 1600 of a serving cell 1602 and several intra-frequency neighboring cells 1604, a corresponding SIB 15 1606 for the serving cell, a transposed SAI5 index 1608, and a transposed SAI29 index 1610. Cell 1 supports SAI1 and SAI2. Cell 107 supports SAI1 and SAI2. Cell 224 supports SAI1, SAI2 and SAI5. Cell 105 supports SAI1, SAI2, SAI5 and SAI29. In this example, a UE is camped on Cell 224, and the SIB15 1606 the UE receives from Cell 224 includes a neighboring intra-frequency cell list 1612, Ngb_PCI_List=[107, 1, 105].

In order to convey to the UE, the mapping of SAI5 to neighboring cells, the SAI5 index 1608 may be formatted as a transposed SAI that includes the generic SAI index for SAI5, a neighboring CPI index 1614 defined by three bits, and a self-association bit 1616. Each of the three bits of the neighboring CPI index 1614 corresponds to a respective one of the neighboring cells listed in the Ngb_PCI_List. The value (e.g., 0 or 1) of the bit serves as an indication as to whether the neighboring cell associated with the bit supports the particular SAI. In this example, the bit value associated with Cell 105 is "0" because Cell 105 does support SAI5; the bit value associated with Cell 1 is "1" because Cell 1 does not support SAI5; and the bit value associated with Cell 107 is "1" because Cell 107 does not support SAI5. The self-association bit 1616 is "1" because the serving cell Cell 224 does support SAI5. The 16 bit SAI5 index 1608 may be converted into a decimal value (24581) or hexadecimal value (0x6005) and included in that form in the intra-frequency SAI list 1618 of SIB15.

In order to convey to the UE, the mapping of SAI29 to neighboring cells, the SAI29 index 1610 may be formatted as a transposed SAI that includes the generic SAI index for SAI29, a neighboring CPI index 1620 defined by three bits, and a self-association bit 1622. Each of the three bits of the neighboring CPI index 1620 corresponds to a respective one of the neighboring cells listed in the neighboring intra-frequency cell list 1612. The value (e.g., 0 or 1) of the bit serves as an indication as to whether the neighboring cell associated with the bit supports the particular SAI. In this example, the bit value associated with Cell 105 is "0" because Cell 105 does support SAI29; the bit value associated with Cell 1 is "0" because Cell 1 does support SAI29; and the bit value associated with Cell 107 is "1" because Cell 107 does not support SAI29. The self-association bit 1616 is "1" because the serving cell Cell 224 does not support SAI29. The 16 bit SAI29 index 1610 may be converted into a decimal value (57373) or hexadecimal value (0xE01D) and included in that form in the SAI list of SIB15.

The SIB15 1606 includes an intra-frequency SAI list 1618, e.g., SAI_List={1, 2, 24581, 57373}. The "1" and "2" indicate that SAI1 and SAI2 are broadcasting on the serving cell: Cell 224, and one or more of the neighboring cells: Cell 1, Cell 105 and Cell 107. The "24581" (e.g., tSAI_5) in the intra-frequency SAI list 1618 indicates the existence of a SAI that may be available on one or more neighboring cells. The "57373" (e.g., tSAI_29) in the intra-frequency SAI list 1618 also indicates the existence of another SAI that may be available on one or more neighboring cells.

On the UE side, upon receipt of SIB15, the UE derives the mapping of SAI to neighboring cells based on the information included in the neighboring intra-frequency cell list 1612 and the intra-frequency SAI list 1618. Based on the format of the information in the intra-frequency SAI list 1618, the UE determines whether an entry on the list corresponds to a transposed SAI. For example, given SAI List={1, 2, 5, 24581, 57373}, the UE determines that 1 indicates SAI1 is supported by the serving cell Cell 224 and all neighboring cells Cell 1, Cell 105 and Cell 107; 2 indicates SAI2 is supported by the serving cell Cell 224 and all neighboring cells Cell 1, Cell 105 and Cell 107. The UE determines that each of 24581 and 57373 indicates a transposed SAI, based on the presence of a valid mbms-Neighboring-PCI-List-IntraFreq-r12 parameter in SIB15. Accordingly, the UE converts each of the decimal values to a 16 bit value and derives the SAI and the neighboring cells mapped to the SAI. In the case of transposed SAI value 24581, the UE determines the SAI is SAI5 based on bits 1-12, e.g., the generic SAI index. The UE further determines, based on bits 13-16, and the order of cell identified in the Ngb_PCI_List= [107, 1, 105] that Cell 105 does support SAI5, Cell 1 and Cell 107 do not support SAI5, and the serving cell Cell 224 does support SAI5. The latter is determined based on the self-association bit 1616, wherein the value "0" indicates SAI5 is supported by Cell 224.

In the case of transposed SAI value 57373, the UE determines the SAI is SAI29 based on bits 1-12, e.g., the generic SAI index. The UE further determines, based on bits 13-16, and the order of cell identified in the Ngb_PCI_List= [107, 1, 105], that neighboring cell: Cell 105 does support SAI29, neighboring cells: Cell 1 and Cell 107 do not support SAI29, and the serving cell: Cell 224 does not support SAI29. The latter is determined based on the self-association bit 1622, wherein the value "1" indicates SAI29 is not supported by the serving cell.

Figure 35:
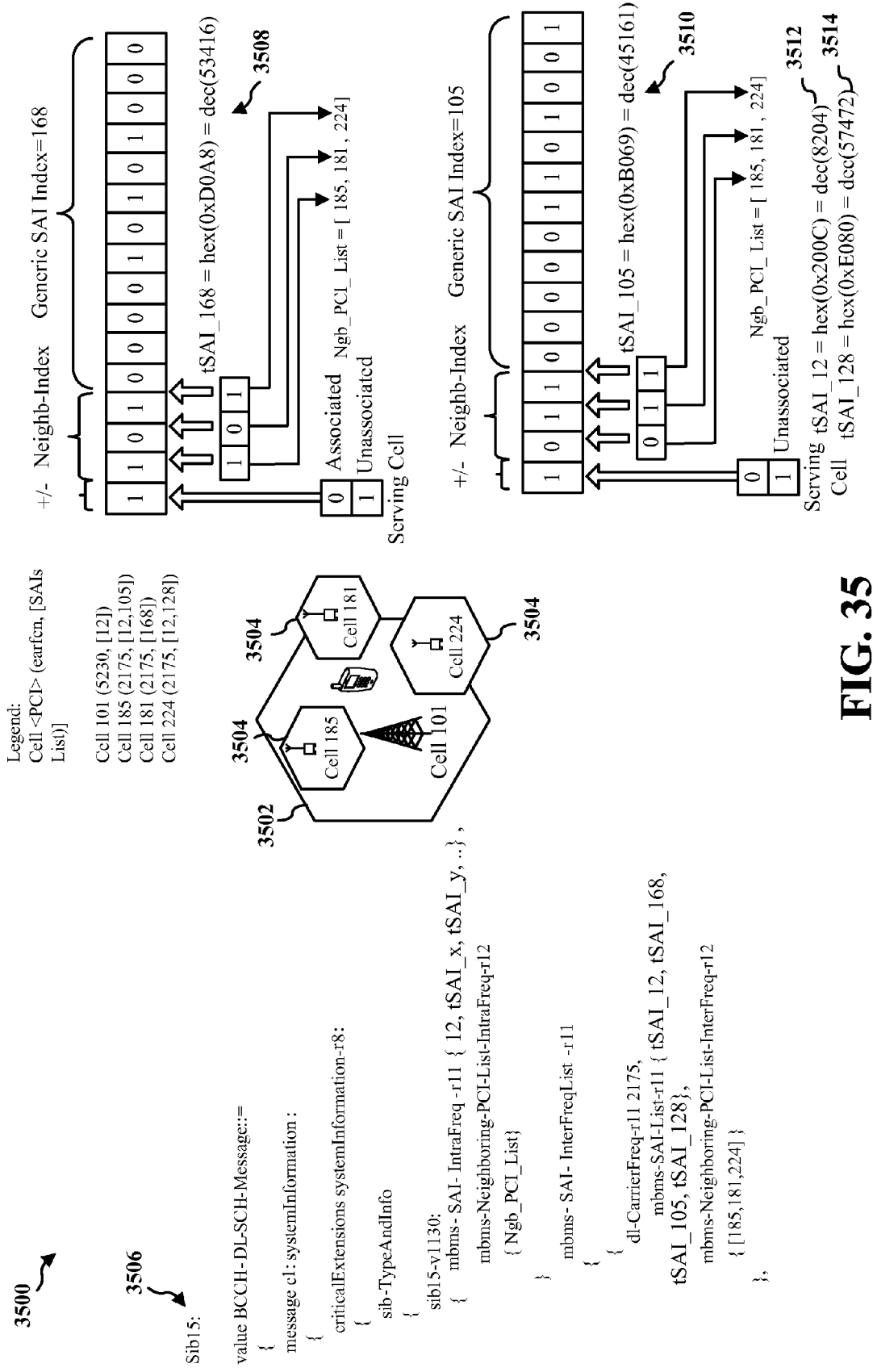
FIG. 35 is an illustration of a serving cell and several inter-frequency neighboring cells, a corresponding SIB15 for the serving cell, and several transposed SAI indices.

The examples of FIG. 15 and FIG. 16 relate to the addition of intra-frequency SAIs by an intra-frequency parameter (e.g., mbms-SAI-IntraFreq-r11) to SIB15. The same concepts described with respect to these figures and intra-frequency parameters apply to the addition of inter-frequency SAIs by an inter-frequency parameter. FIG. 35 is an illustration 3500 of a serving cell 3502 and several inter-frequency neighboring cells 3504, a corresponding SIB15 3506 for the serving cell, a transposed SAI168 index 3508, a transposed SAI105 index 3510, a transposed SAI12 index 3512, and a transposed SAI128 index 3514. Bit mapping are shown only for the SAI 168 and SAI 105 indices. The conveyance of SAI mapping information to the UE and derivation by the UE of such mapping information is the same as described above with reference to FIG. 15 and FIG. 16 and is not repeated herein.

Figure 17:
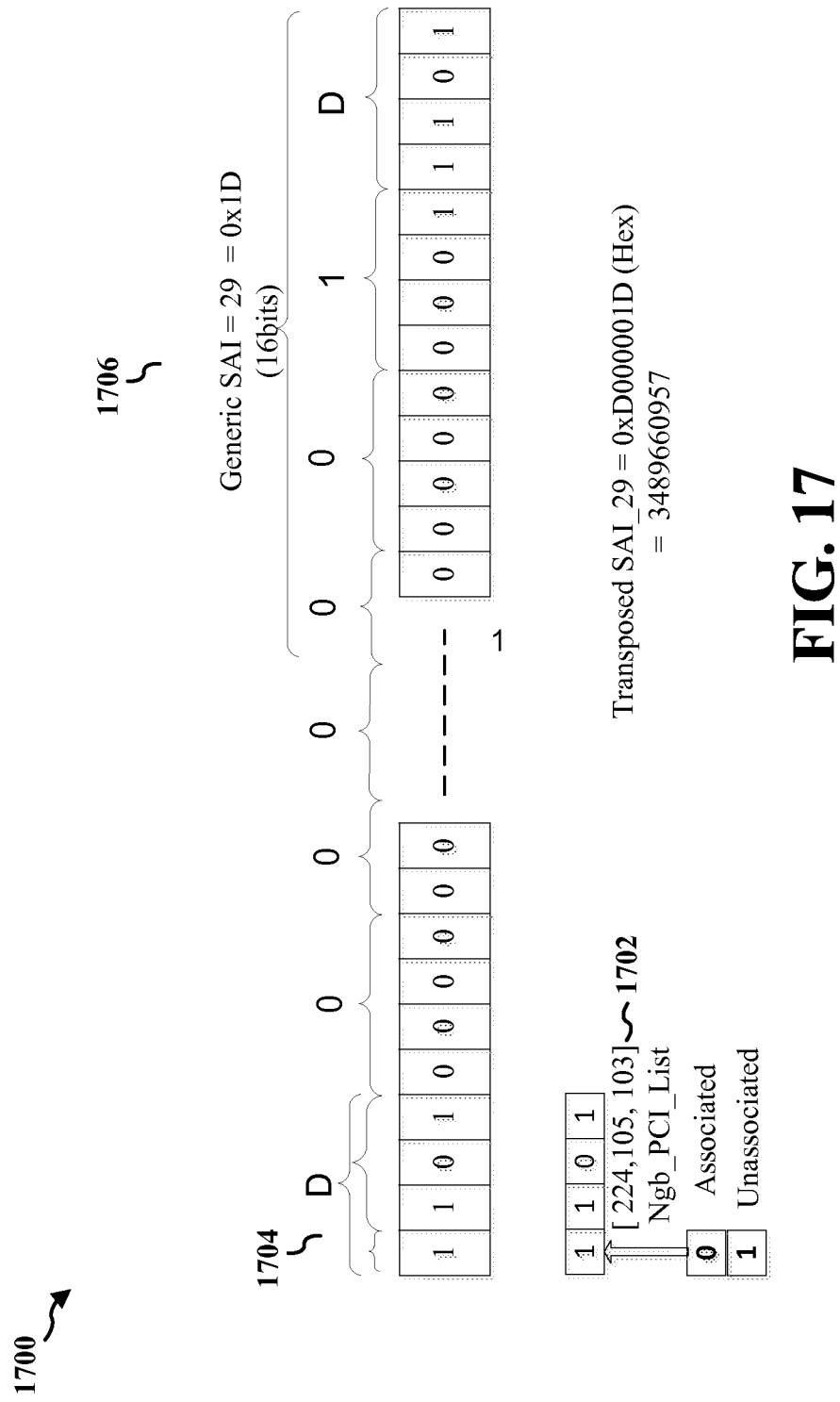
FIG. 17 is an illustration of an extended SAI index.

FIG. 17 is an illustration 1700 of an extended SAI index. The above described implementations of the first alternative, as described with respect to FIG. 15 and FIG. 16, are based on existing standards which use 16 bits for the SAI index. However, depending on the number of neighboring cells, the bit size of the neighboring cell index may increase or decrease. As the bit size increases, the number of bits available for the generic SAI index 1706 decreases. FIG. 17 presents a bit format that extends the number of bits for the SAI index from 16 bits to 32 bits, with an option to be coded in a hexadecimal format. The hexadecimal bit format provides improved flexibility over the 16 bit format in that the hexadecimal bit format allows for the mapping of an increased number of neighboring cells. Note: Per 3GPP, TS136.33_v11, the maximum number of neighboring cells listed in SIB4 is 16; this is the same as the maximum number of neighboring inter-frequency cells in SIB5 (e.g., 16 per frequency). However, the hexadecimal bit format might not be a realistic deployment scenario to have more than ten neighboring cells with eMBMS support at a time. With extending the SAI bits to 32 bits, a generic SAI=29 may be presented as SAI=0x1D.

FIG. 18 is an illustration of an eMBMS interest indicator message 1800 that includes an additional parameter 1802, mbms-pci_cai_interest, referred to as an eMBMS interest indicator message. The eMBMS interest indicator message 1802 may be used during RRC connect mode and relates to handover. As a result of the above SAI-to-neighboring-cell mapping, the UE obtains more information about the SAIs supported by the neighboring cells. The UE may inform the network about a specific cell that the UE would like to handover to, from an eMBMS application perspective. To this end, the eMBMS interest indicator message 1802 provides two values: a Physical Cell Id (PCI) Index 1804 (e.g., 391) to identify a specific physical cell, and a carrier aggregation indicator 1806 (e.g., CAI) to assist a new eMBMS service activation under the multi-band and carrier aggregation deployment.

Alternative A2: Correlation bit-mapping between SIB15 to SIB4/SIB5

In a second alternative, a bit-mapping mechanism may be used to map SAI information to neighboring cells with a correlation of SIB4/SIB5. Under this alternative a cell position index (CPI), or cell position association (CPA), parameter is added to SIB15.

FIG. 19 is an example SIB15 1900 with a mbms Cell Position-Association (CPA) for Inter-Frequency parameter 1902. The parameter may be an eight bit Hex Value: 0xA3 in (xxxx yyyy), where:
xxxx: category of SAI mapping
yyyy: number of reserved MSB bits in SAI
Category of SAI mapping:
0: generic 16 bit SAI
A: 32 bit SAI is used (additional 16 bit extension is used)
B: 24 bit SAI is used (additional 8 bit extension is used)

Figure 20:
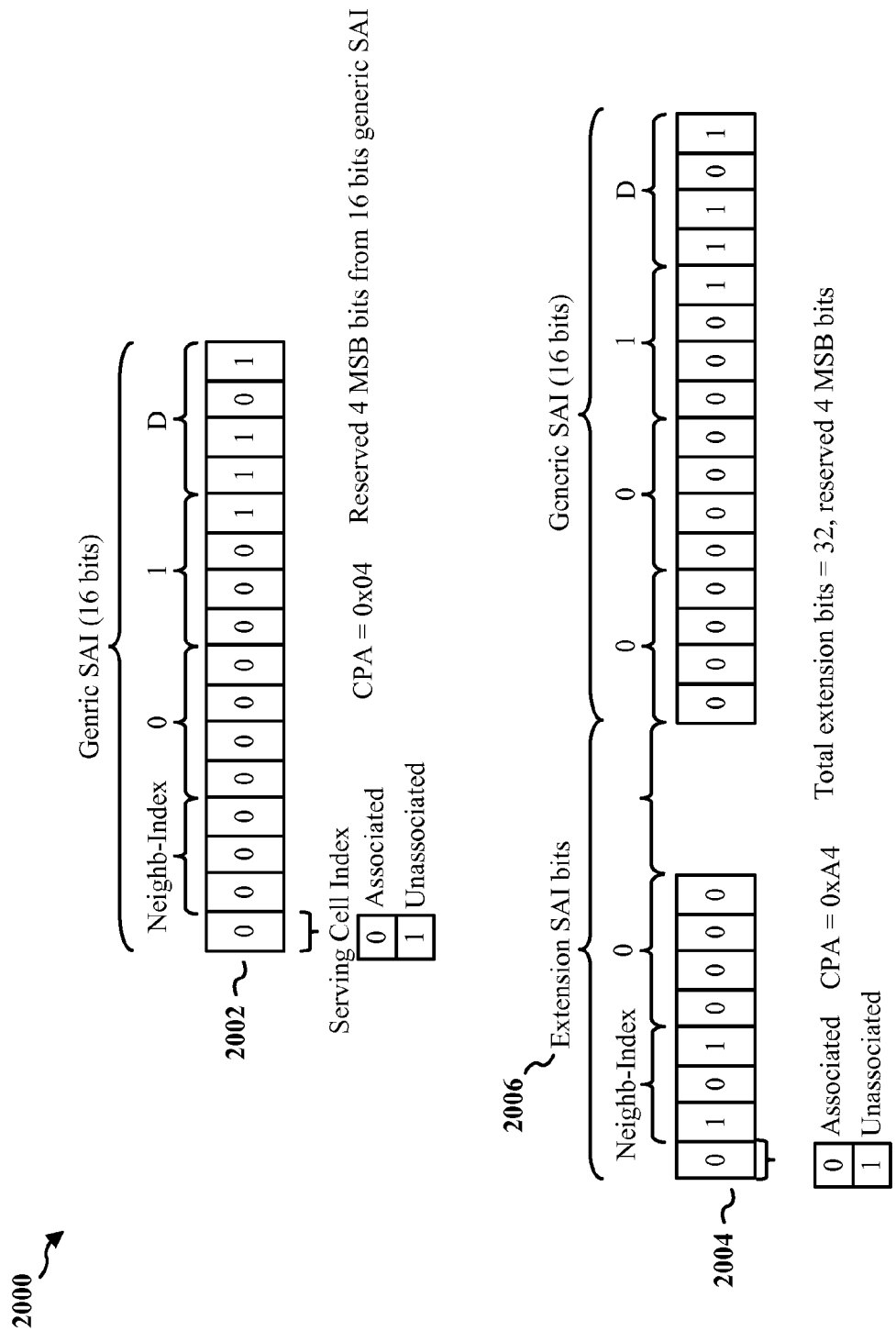
FIG. 20 is an illustration of a format of a 16 bit CPA parameter and a format of a 32 bit CPA parameter.

FIG. 20 is an illustration 2000 of a format of a 16 bit CPA parameter 2002 and a format of a 32 bit CPA parameter 2004 corresponding to different CPA parameters provided by, for example, the SIB 15 of FIG. 19. In the case of the 16 bit CPA parameter 2002, CPA=0x04 indicates that the four MSB of a generic 16 bits SAI value are reserved for cell mapping with SIB4/SIB5. The first MSB bit is used for the serving cell indication, the rest of three bits will be correlated to the SIB4/SIB5 neighboring cell. In the case of a 32 bit CPA parameter 2004, CPA=0xA4 indicates that the four MSB of the extension bits 2006 are reserved for cell mapping with SIB4/SIB5. In this case, the maximum number of MSB bits that can be reserved for bit mapping is 16 (as the generic SAI size). In another case of the 24 bit CPA parameter 2004, CPA=0xB4 (not shown) indicates that the four MSB are reserved for the cell mapping with SIB4/SIB5 from the extension bits in addition to the 8 bits generic SAI value. In this case, the maximum number of MSB bits that can be reserved for bit mapping is 8.

Figure 21:
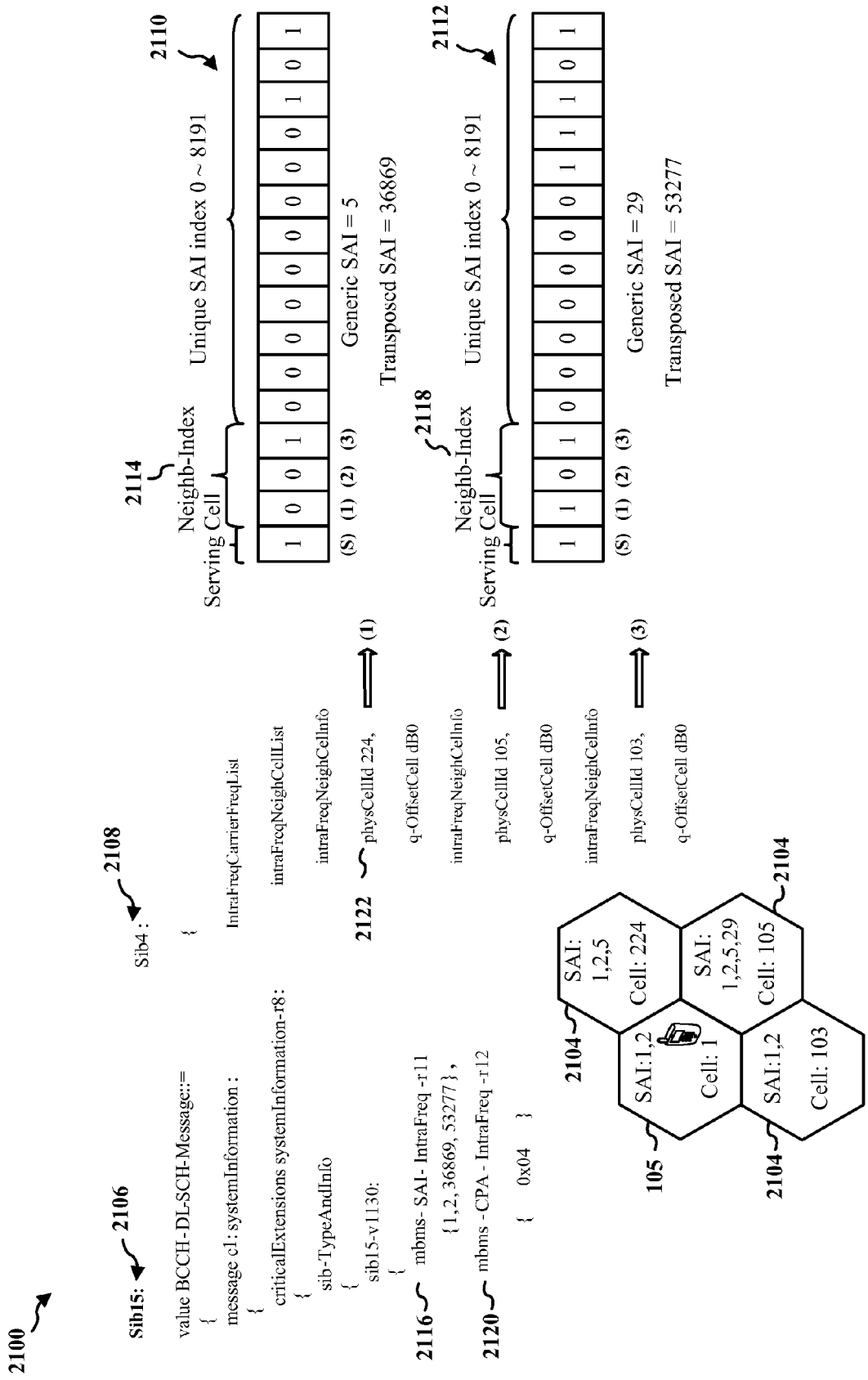
FIG. 21 and FIG. 22 are illustrations of a serving cell and several intra-frequency neighboring cells, a corresponding SIB15 for the serving cell, a corresponding SIB4 for the serving cell, a transposed SAI5 index, and a transposed SAI9 index.

FIG. 21 is an illustration 2100 of a serving cell 2102 and several intra-frequency neighboring cells 2104, a corresponding SIB15 2106 for the serving cell, a corresponding SIB4 2108 for the serving cell, a transposed SAI5 index 2110, and a transposed SAI29 index 2112. Cell 1 supports SAI1 and SAI2. Cell 103 supports SAI1 and SAI2. Cell 224 supports SAI1, SAI2 and SAI5. Cell 105 supports SAI1, SAI2, SAI5 and SAI29. In this example, a UE is camped on Cell 1, and the SIB15 2106 the UE receives from Cell 1 includes a CPA parameter 2120 (e.g., mbms-CPA-IntraFreq-r12=0x04). The CPA parameter 2120 indicates the presence of information that may be used to map SAIs to neighboring cells. A CPA parameter=0x04 indicates a 16 bit SAI format is used (based on current standard) and up to three bits may be mapped to the neighboring cell to a list of cells that support a particular SAI, and the "4" indicates the number of neighboring cells (three) plus the serving cell that may be added to the list.

In order to convey to the UE, the mapping of SAI5 to neighboring cells, the SAI5 index 2110 may be formatted as a transposed SAI that includes the generic SAI index for SAI5, and a neighboring CPI index 2114 defined by three bits. Each of the three bits of the neighboring CPI index 2114 corresponds to a respective one of the neighboring cells listed in the SIB4 2108. The value (e.g., 0 or 1) of the bit serves as an indication as to whether the neighboring cell associated with the bit supports the particular SAI. In this example, the bit value associated with Cell 224 is "0" because Cell 224 does support SAI5; the bit value associated with Cell 105 is "0" because Cell 105 does support SAI5; and the bit value associated with Cell 103 is "1" because Cell 103 does not support SAI5. The first bit of serving cell is set to "1" as serving cell, Cell 1, does not support SAI5. The 16 bit SAI5 index 2110 may be converted into a decimal value (36869) or hexadecimal value and included in that form in the intra-frequency SAI list 2116 of SIB15. The meaning of the bit values may be reversed, i.e. "0" may indicate a cell does not support a particular SAI, and "1" may indicate a cell does support a particular SAI. In other aspects, the bit values may be set to "true" to indicate a cell does support a particular SAI or "false" to indicate a cell does not support a particular SAI.

In order to convey to the UE, the mapping of SAI29 to neighboring cells, the SAI29 index 2112 may be formatted as a transposed SAI that includes the generic SAI index for SAI29, and a neighboring CPI index 2118 defined by three bits. Each of the three bits of the neighboring CPI index 2118 corresponds to a respective one of the neighboring cells listed in the SIB4 2108. The value (e.g., 0 or 1) of the bit serves as an indication as to whether the neighboring cell associated with the bit supports the particular SAI. In this example, the bit value associated with Cell 224 is "1" because Cell 224 does not support SAI29; the bit value associated with Cell 105 is "0" because Cell 105 does support SAI29; and the bit value associated with Cell 103 is "1" because Cell 103 does not support SAI29. The first bit of serving cell is set to "0" as serving cell, Cell 1, does support SAI29. The 16 bit SAI9 index 2112 may be converted into a decimal value (53277) or hexadecimal value and included in that form in the intra-frequency SAI list 2116 of SIB15.

The SIB15 2106 includes an intra-frequency SAI list 2116, e.g., SAI_List={1, 2, 36869, 53277}. The "1" and "2" indicate that SAI1 and SAI2 are available on both the serving cell: Cell 1, and the neighboring cells: Cell 105, Cell 103 and Cell 224. The "36869" in the intra-frequency SAI list 2116 indicates the existence of a SAI that may be available on one or more neighboring cells. The "53277" in the intra-frequency SAI list 2116 indicates the existence of a SAI that may be available on one or more neighboring cells.

On the UE side, upon receipt of SIB15 and SIB4, the UE derives the mapping of SAI to neighboring cells based on information included in the intra-frequency SAI list 2116 and the CPA parameter 2120 of SIB15 and the physical cell identifiers 2122 of SIB4. Based on the format of the information in the intra-frequency SAI list 2116, the UE determines whether an entry on the list corresponds to a transposed SAI. For example, given SAI_List={1, 2, 36869, 53277}, the UE determines that 1 indicates SAI1 is supported by the serving cell: Cell 1 and all neighboring cells: Cell 105, Cell 103 and Cell 224; and 2 indicates SAI12 is supported by the serving cell: Cell 1 and all neighboring cells: Cell 105, Cell 103 and Cell 224. The UE determines that each of 36869 and 53277 indicates a transposed SAI. Accordingly, the UE converts each of the decimal values to a 16 bit value, and derives the SAI and the neighboring cells mapped to the SAI. In the case of 53277, the UE determines the SAI is SAI5 based on bits 1-12, e.g., the generic SAI index. The UE further determines, based on bits 13-15, and the order of cells identified by the PCIs 2122 in the SIB4, (e.g., [224, 105, 103]) that Cell 224 (bit 15=0) and Cell 105 (bit 14=0) do support SAI 5, and Cell 103 (bit 13=1) does not support SAI5. The serving cell (bit 16=1), Cell 1, does not support SAI5.

In the case of 52377, the UE determines the SAI is SAI29 based on bits 1-12, e.g., the generic SAI index. The UE further determines, based on bits 13-16, the serving cell Cell 1 (bit 16=1) does not support SAI29 and the order of cell identified by the PCIs 2122 in the SIB4, (e.g., [224, 105, 103]) and service cell that Cell 224 (bit 15=1) and Cell 103 (bit 13=1) do not support SAI29, and Cell 105 (bit 14=0).

Figure 22:
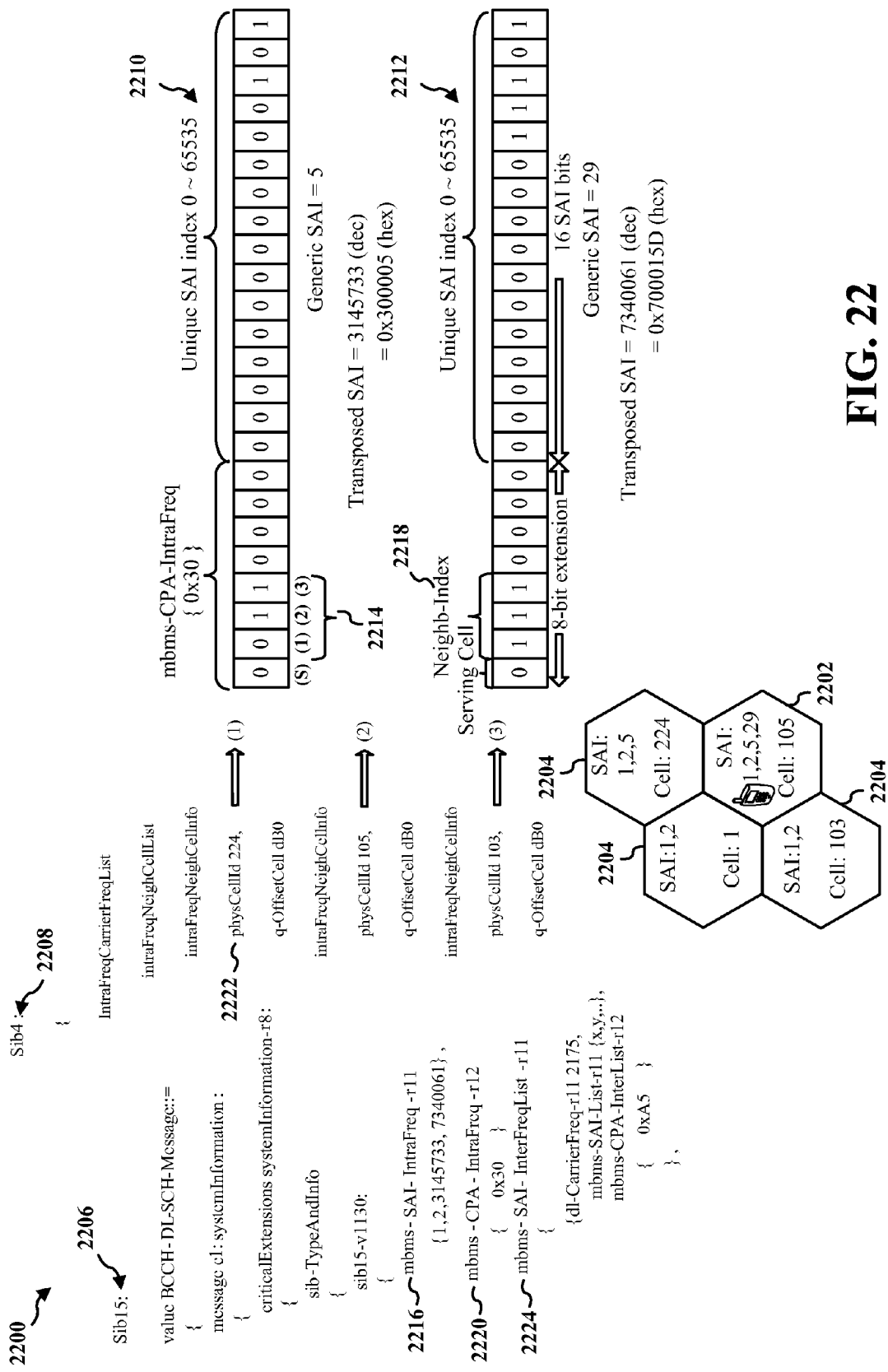

FIG. 22 is an illustration 2200 of a serving cell 2202 and several intra-frequency neighboring cells 2204, a corresponding SIB15 2206 for the serving cell, a corresponding SIB4 2208 for the serving cell, a transposed SAI5 index 2210, and a transposed SAI29 index 2212. Cell 1 supports SAI1 and SAI2. Cell 103 supports SAI1 and SAI2. Cell 224 supports SAI1, SAI2 and SAI5. Cell 105 supports SAI1, SAI2, SAI5 and SAI29. In this example, a UE is camped on Cell 105, and the SIB15 2206 the UE receives from Cell 105 includes a CPA parameter 2220 (e.g., mbms-CPA-IntraFreq-r12=0xB4). The CPA parameter 2220 indicates the presence of information that may be used to map SAIs to neighboring cells. In the case of CPA parameter=0xB4, it indicates that the 24 bits SAI format is used (8 extension bits plus 16 bits SAI) to correlate one or more neighboring cell from a list of cells that support a particular SAI. Eight extension bits implies that 1 serving cell and up to 7 neighboring cells may be correlated with the specific SAI with SIB4.

In order to convey to the UE, the mapping of SAI5 to neighboring cells, the SAI5 index 2210 may be formatted as a transposed SAI that includes the generic SAI index for SAI5, and a neighboring CPI index 2214 defined by three bits. Each of the three bits of the neighboring CPI index 2214 corresponds to a respective one of the neighboring cells listed in the SIB4 2208. The value (e.g., 0 or 1) of the bit serves as an indication as to whether the neighboring cell associated with the bit supports the particular SAI. In this example, the bit value associated with Cell 224 is "0" because Cell 224 does support SAI5; the bit value associated with Cell 1 is "1" because Cell 1 does not support SAI5; and the bit value associated with Cell 103 is "1" because Cell 103 does not support SAI5. The transposed SAI5 to a new 24 bits SAI format index 2210 may be converted into a decimal value (3145733) or hexadecimal value (0x300005) and included in that form in the intra-frequency SAI list 2216 of SIB15. The UE may recognize a transposed SAI base on the format, e.g. large decimal value, or hexadecimal value. Alternatively, the UE may determine that an SAI in SIB15 is a transposed SAI if the USD does not include that SAI.

In order to convey to the UE, the mapping of SAI29 to neighboring cells, the SAI29 index 2212 may be formatted as a transposed SAI that includes the generic SAI index for SAI29, and a neighboring CPI index 2218 defined by three bits. Each of the three bits of the neighboring CPI index 2218 corresponds to a respective one of the neighboring cells listed in the SIB4 2208. The value (e.g., 0 or 1) of the bit serves as an indication as to whether the neighboring cell associated with the bit supports the particular SAI. In this example, the bit value associated with the serving cell is "0" because Cell 105 does support SAI29, the bit value associated with Cell 224 is "1" because Cell 224 does not support SAI29; the bit value associated with Cell 1 is "1" because Cell 1 does not support SAI29; and the bit value associated with Cell 103 is "1" Cell 103 does not support SAI29. The 16 bit SAI29 index 2212 may be converted into a decimal value (7340061) or hexadecimal value (0x70001D) and included in that form in the intra-frequency SAI list 2216 of SIB15.

The SIB15 2206 includes an intra-frequency SAI list 2216, e.g., SAI_List={1, 2, 3145733, 7340061}. The "1" and "2" indicate that SAI1 and SAI2 are available on both the serving cell: Cell 1, and the neighboring cells: Cell 105, Cell 103 and Cell 224. The "3145733" in the intra-frequency SAI list 2216 indicates the existence of a SAI that may be available on one or more neighboring cells. The "7340061" in the intra-frequency SAI list 2216 indicates the existence of a SAI that may be available on one or more neighboring cells.

On the UE side, upon receipt of SIB15 and SIB4, the UE derives the mapping of SAI to neighboring cells based on information included in the intra-frequency SAI list 2216 and the CPA parameter 2220 of SIB15 and the physical cell identifiers 2222 of SIB4. Based on the format of the information in the intra-frequency SAI list 2216, the UE determines whether an entry on the list corresponds to a transposed SAI. For example, given SAI_List={1, 2, 3145733, 7340061} in associated with CPA parameter=0xB4, the UE determines that "1" indicates SAI1 is supported by the serving cell: Cell 1 and all neighboring cells: Cell 105, Cell 103 and Cell 224; and "2" indicates SAI2 is supported by the serving cell: Cell 1 and all neighboring cells: Cell 105, Cell 103 and Cell 224. The UE determines that each of "3145733" and "7340061" indicates a transposed SAI. Accordingly, the UE converts each of the decimal values to a 24 bit value and derives the SAI and the neighboring cells mapped to the SAI. In the case of "3145733", the UE determines the SAI is SAI5 based on bits 1-16, e.g., the generic SAI index. With the CPA value set to "0xB4", the UE further determines, based on bits 21-24, the bit 24 represents the serving cell and bit 21-23 are correlated with the order of cells identified in the PCIs 2222 of SIB4 (e.g., [224, 1, 103]) that Cell 224 (bit 23=0) does support SAI 5, and Cell 1 (bit 22=1) and Cell 103 (bit 21=1) do not support SAI5.

In the case of "7340061", the UE determines the SAI is SAI29 based on bits 1-16, e.g., the generic SAI index. With the CPA value set to "0xB4", the UE further determines, based on bits 21-23, and the order of cell identified in the PCIs 2222 of SIB4 (e.g., [224, 1, 103]) that Cell 224 (bit 23=1), Cell 1 (bit 22=1) and Cell 103 (bit 21=1) do not support SAI29. The foregoing mapping mechanism may be applied to the inter-frequency SAI list 2224 as well.

Figure 23:
FIG. 23 is an illustration of an eMBMS interest indicator message that includes an additional parameter, mbms-pci_c-ai_interest.

FIG. 23 is an illustration of an eMBMS interest indicator message 2300 that may include an additional optional parameter 2302, mbms-pci_cai_interest. The mbms-pci_cai_interest parameter 2302 may be used during RRC connect mode and relates to handover. The eMBMS interest indicator message 2300 may be sent by a UE to a network component, e.g., eNB, of a serving cell to obtain assistance from the network for cell handover and to inform the network of a carrier aggregation preference for eMBMS.

The mbms-pci_cai_interest-r12 parameter 2302 includes two components: <Physical_Cell_Id> 2304, e.g., 391, and a <Carrier_Aggregation_Index> 2306, e.g., Y. If the carrier aggregation index (CAI) 2306 is not included in the mbms-pci_cai_interest parameter 2302 or the value Y of CAI is set to a value that indicates a non-CA option, then the regular multi-band scenario is applied, provided the PCI included in the eMBMS interest indicator message 2300 is associated with a frequency different from the frequency of the cell on which the UE is camped.

If a CAI 2306 has a value Y in the mbms-pci_cai_interest parameter 2302 that indicates a carrier aggregation option, then the network component may implement CA functions and/or assist in handover performance based on the carrier aggregation option. The particular value assigned to CAI 2306 may represent one of various carrier aggregation options defined by a value-to-option mapping. These options are intended to inform the network component of the UE's preference for cell usage while the UE is engaged in carrier aggregation operations, e.g., a CA call, in eMBMS. Following are some examples for the mappings of the value Y of CAI 2306 for eMBMS:

"0" or Null—Carrier aggregation is not considered.

"1"—Carrier aggregation on the new cell which serves as a Secondary Component Carrier (SCC) with DL support only (asymmetric aggregation)

"2"—Carrier aggregation on the new cell which serves as a SCC with both DL/UL aggregation "3"—Carrier aggregation on the new cell which serves as a new Primary Component Carrier (PCC)

"4"—Carrier aggregation on the new cell which serves as a configurable secondary cell (c-SCell)

Setting the CAI 2306 to "1" or "2" may indicate that the new cell corresponding to the <Physical_Cell_Id> 2304 included in the mbms-pci_cai_interest parameter 2302 is preferred by the UE to be used as a SCC for carrier aggregation. In this case, the network may determine to implement carrier aggregation only on DL, or on both DL/UL. Setting the CAI 2306 to "3" may indicate that the new cell corresponding to the <Physical_Cell_Id> 2304 included in the mbms-pci_cai_interest parameter 2302 is preferred by the UE to be used as a Primary Component Carrier (PCC) for carrier aggregation. In this case, the network may perform a cell handover to the new cell which will be used as the PCC, while the old cell serves as a SCC.

Figure 24:
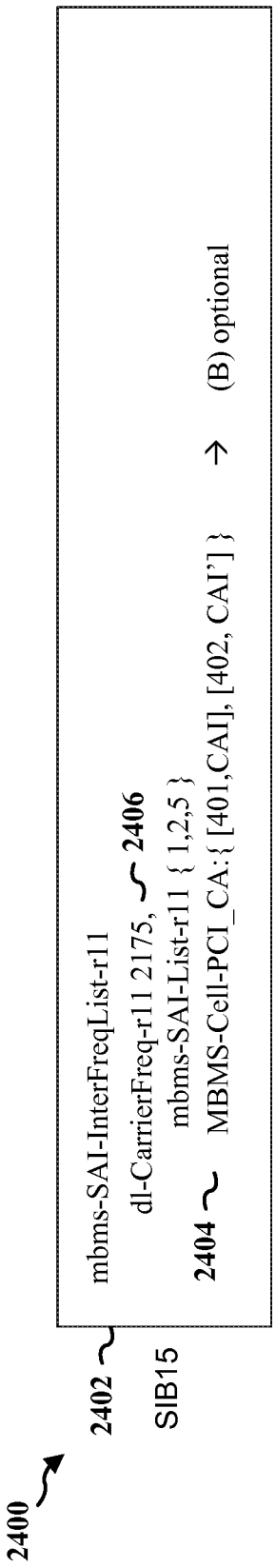

FIG. 24 includes an illustration 2400 of another alternative format to represent inter-frequency list 2402 of a SIB15. In accordance with embodiments disclosed herein, an optional parameter of MBMS-Cell-PCI_CA 2404 may be included in the inter-frequency list 2402 to provide a list of {[PCI, CAI], [PCI', CAI']}. The dl-CarrierFreq parameter 2406 specifies the component carrier (e.g., earfcn 2175) of the neighboring inter-frequency cell. The PCI may be the same used to hash with SIB5. The CAI information in SIB15 implies the recommendation from the network to UE about its neighboring cell's usage preference of carrier support. As the carrier aggregation service is initiated by the UE under the RRC connected mode, the UE can either piggy back the network's recommendation or make a different CA category request in the eMBMS interest indication message as described earlier.

The CAI of the MBMS-Cell-PCI CA 2404 may indicate one of the following: the cell is intra-band/inter-band contiguous, the preference for use of the cell as a primary component carrier (PCC) or a secondary component carrier (SCC), a different bandwidth on the cell, or the cell supports downlink only. The CAI serves as an earlier indicator of the information in SIB2 (for PCC DL/UL information), so that the UE does not need to acquire SIB2 of a new cell for the decision.

FIG. 25 includes illustrations 2500 of a first inter-frequency list 2502 and a second inter-frequency lists 2504 of a SIB15 and an inter-frequency carrier frequency list 2506 of a SIB5. In accordance with embodiments disclosed herein, each of the inter-frequency lists 2502, 2504 may include one or more optional parameters of MBMS-Cell-PCI_CA 2508, 2510, 2512. These parameters 2508, 2510, 2512 provide a list of {[PCI, CAI], [PCI', CAI']}. The dl-CarrierFreq parameters 2514, 2516 specify the component carrier (e.g., earfcn 2175, earfcn 2339) for the neighboring inter-frequency cell.

The CAI of an MBMS-Cell-PCI_CA parameters 2508, 2510, 2512 may indicate one of the following: the cell is intra-band/inter-band contiguous, the preference for use of the cell as a primary component carrier (PCC) or a secondary component carrier (SCC), a different bandwidth on the cell, or the cell supports downlink only. The CAI serves as an earlier indicator of the information in SIB2 (for PCC DL/UL information), so that the UE does not need to acquire SIB2 of a new cell for the decision. As carrier aggregation is only supported in the connected mode, a modification of the eMBMS interest indication is proposed.

Alternative A3: Create Groups of Cells by Physical Cell Identifier (PCI) within SIB4 and SIB5:

FIG. 26 is an illustration 2600 of portions of SIB4 and SIB5. As an enhancement to the foregoing alternatives, groups of neighboring cells that support same SAIs may be indicated in either of SIB4 or SIB5. To this end, the PhysCellId parameter 2602 of SIB4 and the interFreqNeighbCellList 2606 of SIB5 may order the neighboring cells in sets of PCIs based on common SAI support, and may provide the number of PCIs in each set. For example, with reference to FIG. 9, the parameter 2602 may provide the ordered PCI list [107, 129, 203, 135, 156, 162, 4, 205]. Parameter 2604 may then provide the number of cells for each group of neighboring cells broadcasting the same eMBMS content. For example, parameter 2604 may provide the list [3,3,2], meaning that the neighboring cells are broadcasting 3 different sets of contents with the set of cells in group 1 having PCIs [107, 129, 203], the set of cells in group 2 having PCI2 [135, 156, 162], and the set of cells in group 3 having PCIs [4,205]. Thus, before making an intra-frequency switch to a new cell, the device would be aware of content differences between the current cell and the intra-frequency neighbor cell.

Similar information may also be provided for inter-frequency neighbors in SIB5. For example, with reference to FIG. 9, the parameter 2606 may provide the ordered PCI list [108, 130, 204, 136, 157, 163, 5, 206]. Parameter 2608 may then provide the number of cells for each group of neighboring cells broadcasting the same eMBMS content. For example, parameter 2604 may provide the list [4,2,2], meaning that the inter-frequency neighboring cells are broadcasting 3 different sets of contents with the set of cells in group 1 having PCIs [108, 130, 204, 136], the set of cells in group 2 having PCI2 [157, 163], and the set of cells in group 3 having PCIs [5,206]. Thus, before making an inter-frequency switch to a new cell and using PCI measurements on neighbor frequencies an initial probe of the SAIs supported on the neighboring inter-frequency cell, the device would be aware of whether the content on the neighboring cell remains the same or whether the neighboring inter-frequency frequency cell has changed to a cell in a new group which means that the device may want to probe the neighboring cell again to discover the list of SAIs supported on the inter-frequency neighboring cell. The Embms-IntrFreq-NeighCellGroups parameter 2604 of SIB4 and the Embms-IntrFreqNeighCellGroups parameter 2608 of SIB5 may include an implicit indexing: groups 0, 1, etc, wherein the number of PCIs per group indicates the successive PceInds in the PhysCellId parameter 2602 or interFreqNighbCellList 2606.

FIG. 27 is an illustration 2700 of a simplified SIB15. The SIB15 may include one or more intra-frequency index parameters 2702, 2704 that list the indices of the PCI groups as defined in Embms-IntrFreqNeighCellGroups parameter 2604 (FIG. 26) of SIB4. The SIB15 may also include one or more inter-frequency index parameters 2706 that list the indices of the PCI groups as defined in Embms-IntrFreqNeighCellGroups parameter 2608 (FIG. 26) of SIB5.

Alternative A4: Provide SIB15 Hash for every neighboring cell or cell group

FIG. 28 is an illustration 2800 of a SIB15 including a hash of the SIB15 on each neighboring cell list identified by PCI and EARFCN as in the above. The hash may be a calculated CRC on the frequency lists in the neighboring cells. In another enhancement to the foregoing alternatives, a hash is used to determine the contents of SIB15 of neighboring cells. This allows the UE to determine the SIB15 content of the current serving cell and neighboring cells from a master SIB15 and the hashes of the SIB15 of the neighboring cells. This enhanced SIB15 2800 contains a master list or superset list of all SAIs supported on current serving cell and neighboring cell frequencies. The intra-frequency list contains the list of all SAIs supported on current and intra-frequency neighboring cells. The inter-frequency list contains the set of all SAIs carried on all cells on each given frequency. For intra-frequency neighboring cells, and for each group of cells identified by the index defined in the SIB4 enhancement described earlier, the enhanced SIB15 would provide a hash of the intra-frequency SAI list for that cell. For the intra-frequency neighbors, the SAIs for inter-frequency neighbors are the same as those of the current cell, so no additional calculations are needed. However, for the list of actual SAIs broadcast in each intra-frequency cell group (including the group of the current cell), the UE tries all the different sub-sets of SAIs in the intra-frequency cell list until one sub-set matches the provided hash (the hash may be on the list itself or on the whole SIB15 for the cell of interest). In this manner, the device is able to determine what SAIs are supported on each cell on the current frequency. Index 0 may be reserved for the group containing the current serving cell. Index 1 and on, would indicate sets of intra frequency PCI groups as shown earlier. The Hash function/scheme could be 16 bit CRC, MD5 or any other hashing scheme.

Alternatively, for the inter-frequency neighbors, the SIB15 list has to be constructed differently. Of interest are the SAIs broadcast on this neighbor cell. The SAIs broadcast on this neighbor cell are a subset of the SAIs specified for that frequency in the master SAI. A hash is provided for this sub-set list. The UE can try all the different sub-set lists of the SAIs on that frequency, until one list matches the provided hash (the hash may be on the list itself or on the whole SIB15 for the cell of interest). Thus, the UE can determine all the SAIs broadcast on each neighboring group of cells. As described earlier, groups of neighboring cells can be identified by an index in SIB5. Through PCI strength measurements on neighbor frequencies, the UE can determine which group of cells the inter-frequency neighbors belong to, and through the process described herein, can then determine what SAIs are broadcast on each of the neighboring inter-frequency cells. With the master SAI list and a hash for each group of intra and inter frequency neighbors, the UE may determine the SAI list broadcast by each neighboring cell and can determine accurately what SAIs are broadcast without having to connect to each neighboring cell to read the SIB15 as is needed currently.

Figure 29:
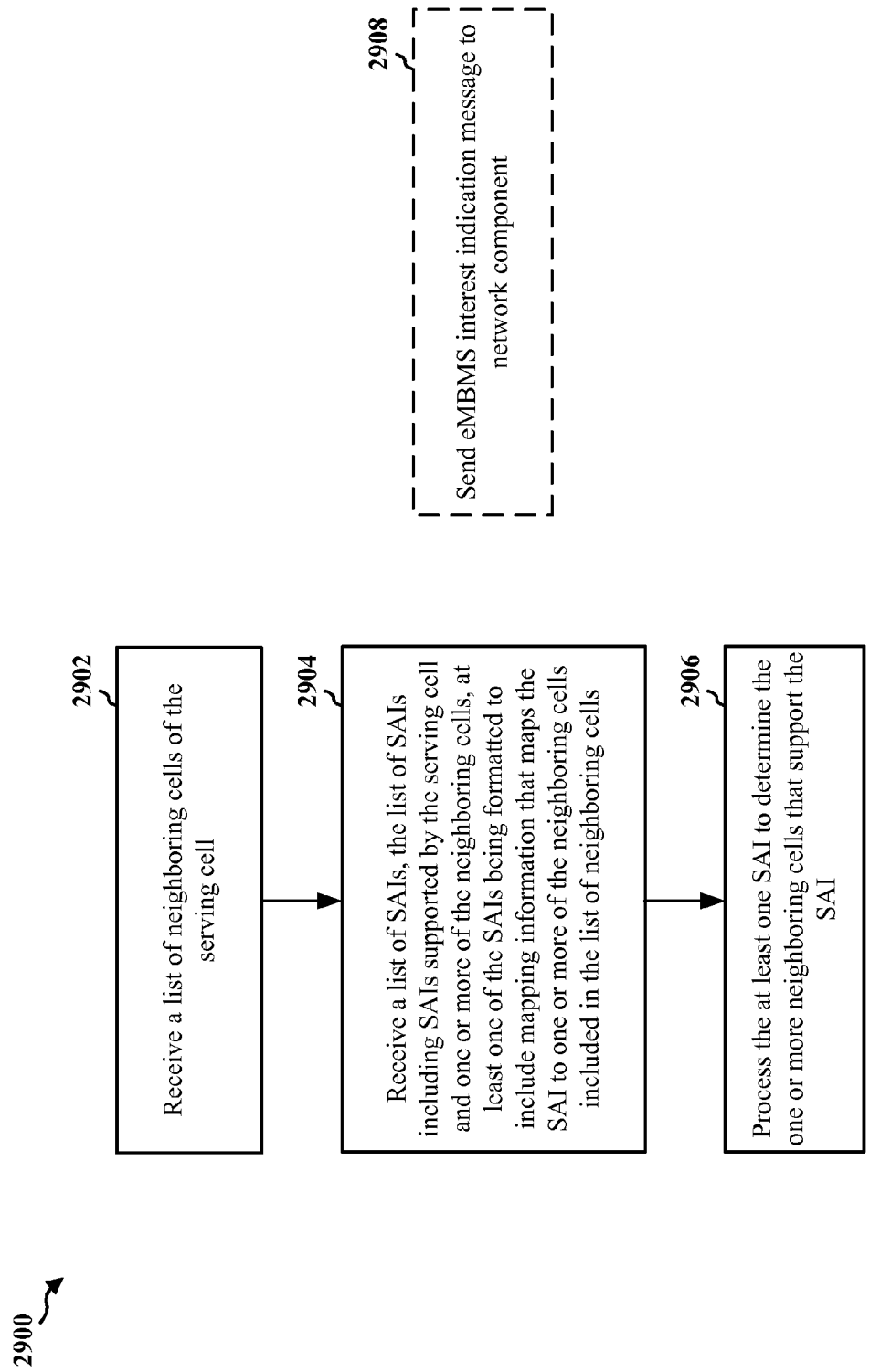
FIG. 29 is a flow chart of a method of wireless communication of a user equipment.

FIG. 29 is a flow chart 2900 of a method of wireless communication. The method may be performed by a UE camped on a serving cell. The method involves a list of neighboring cells and a list of SAIs. The list of neighboring cells may be included in a first parameter of a first system information message and the list of SAIs may be included in a second parameter of a second system information message. The first system information message and the second system information message may be the same message, such as SIB15, or may be combinations of different messages, such as: SIB4 and SIB15; SIB5 and SIB15; and SIB4, SIB5 and SIB15. For example, the second parameter may be included in SIB15 and in some embodiments the first parameter may be a neighboring PCI list included in a SIB15. Accordingly, in this case SIB15 is both the first system information message and the second system information message. In other embodiments, the first parameter may be a neighboring PCI list included in a SIB4 or SIB 5, while the second parameter, e.g., SAI information, is included in SIB15. Accordingly, in this case, the first system information message, e.g., SIB4 or SIB5 is different from the second system information message, e.g., SIB15. At operation 2902, the UE receives a list of neighboring cells of the serving cell. The list of neighboring cells may be included in a first parameter of a first system information message. The first system information message may be received from a network component, e.g., an eNB. The list of neighboring cells may include a list of intra-frequency neighboring cells and/or a list of inter-frequency neighboring cells. In the case of inter-frequency neighboring cells, the list of neighboring cells may include a plurality of lists, wherein each list corresponds to a different carrier frequency.

In accordance with embodiments disclosed herein, the first parameter may be a neighboring PCI list included in a SIB15, in which case SIB15 is the first system information message. For example, with reference to FIG. 14, the first parameter may be mbmsNeighboring-PCI-List-intraFreq-r12 1410 included in SIB15 1406. In another example, with reference to FIG. 35, the first parameter may be mbms-Neighboring-PCI-List-InterFreq-r12 included in SIB15 3506. In this embodiment, additional information, e.g., neighboring cell information, is included directly in SIB15 by the addition of the first parameter. In another embodiment, the first parameter may correspond to neighboring cell frequency information, e.g., PCIs, included in SIB4 or SIB5, in which case the SIB4 or SIB5 is the first system information message. For example, with reference to FIG. 21, the first parameter may be the PCIs 2122 included in SIB4 2108.

At operation 2904, the UE receives a list of service area identifiers (SAI). The list of SAIs may be included in a second parameter of a second system information message. The second system information message may be received from a network component, e.g., an eNB. In accordance with embodiments disclosed herein, the second parameter may be a SAI list included in SIB15, in which case SIB15 is the second information message. For example, with reference to FIG. 14, the second parameter may be mbms-SAI-IntraFreq-r11 1416 included in SIB15 1406. In another example, with reference to FIG. 35, the second parameter may be mbms-SAI-InterFreqList-r11 included in SIB15 3506. The list of SAIs includes SAIs supported by the serving cell and one or more of the neighboring cells. At least one of the SAIs is formatted to include mapping information that maps the SAI to one or more of the neighboring cells included in the list of neighboring cells.

The list of SAIs may be associated with a set of cells, wherein each cell in the set of cells is identified by a PCI. In one embodiment, the list of neighboring cells may be obtained based on an index included in a first system information message received by the UE. The index may implicitly define, for at least one SAI in the list of SAIs, a set of PCIs that support the at least one SAI. In one embodiment, a master list of SAIs is provided per frequency and the list of SAIs carried per group of cells is provided as a hash of the sub-list of SAIs carried on the same frequency as the cell.

At operation 2906, the UE processes the at least one SAI to determine the one or more neighboring cells that support the SAI. In one configuration, the SAI is formatted as one of a decimal value or hexadecimal value of a SAI index that includes a plurality of bits. For example, with reference to FIG. 15, an SAI may be formatted as a 16 bit SAI index 1508. The mapping information, e.g. bit values, is included in a mapping region of the SAI index 1508. With continued reference to FIG. 15, a mapping region may be the four MSBs, which may include a neighboring CPI index 1514 and self-association bit 1516. The UE processes the SAI by converting the SAI to the SAI index, obtaining the mapping information from the mapping region, and determining the one or more neighboring cells that support the SAI based on the mapping information. This process is described above in detail, for example, with reference to FIGS. 15, 16, 21 and 22.

It is noted that while the foregoing process provides the UE with information that maps SAIs to supporting neighboring cells, activation of a service by the UE depends on whether a neighboring cell associated with the SAI of interest is within the neighboring cell list (NCL) of the UE. Accordingly, additional operations performed by the UE leading to activation of a service may include detection of one or more neighboring cells by the UE, for example through signal quality measurements, e.g., RSRP, and determining a presence of a cell that is in the NCL list and that also is associated with the SAI of interest.

At an optional operation 2908, the UE may send an eMBMS interest indication message, such as shown in FIG. 23, to the eNB. Upon receipt of the message from the UE, the eNB may assist the UE to perform a proper cell handover process when the UE is configured for carrier aggregation. The CAI may indicate one of the following functions for the neighboring cell: service as secondary component carrier, service as a primary component carrier, or service as a configurable secondary cell.

Figure 30:
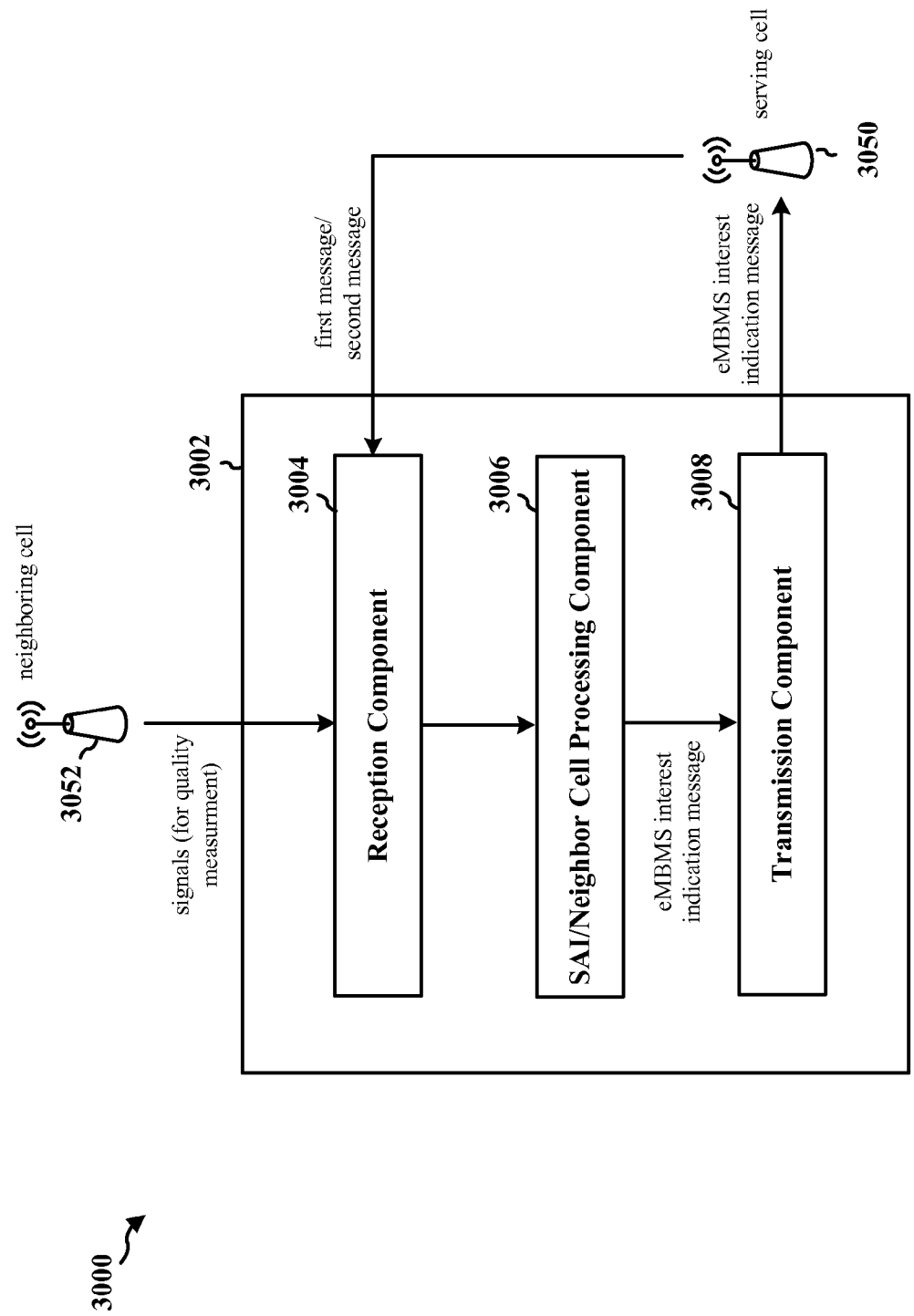
FIG. 30 is a conceptual data flow diagram illustrating the data flow between different means/components in an exemplary apparatus that implements the flow chart of FIG. 29.

FIG. 30 is a conceptual data flow diagram 3000 illustrating the data flow between different means/components in an exemplary apparatus 3002. The apparatus may be a UE camped on a serving cell 3050. The apparatus includes a reception component 3004 that receives a list of neighboring cells of the serving cell 3050, and a list of SAIs from the serving cell 3050. The reception component 3004 may also receive signals from one or more neighboring cells 3052.

The list of neighboring cells may be included in a first parameter of a first system information message and the list of SAIs may be included in a second parameter of a second system information message. The first system information message and the second system information message may be the same message, such as SIB15, or may be combinations of different messages, such as: SIB4 and SIB15; SIB5 and SIB15; and SIB4, SIB5 and SIB15. For example, as noted above, the second parameter is included in SIB15 and in some embodiments the first parameter may be a neighboring PCI list included in a SIB15. Accordingly, in this case SIB15 is both the first system information message and the second system information message. In other embodiments, the first parameter may be a neighboring PCI list included in a SIB4 or SIB5, while the second parameter, e.g., SAI information, is included in SIB15. Accordingly, in this case, the first system information message, e.g., SIB4 or SIB5 is different from the second system information message, e.g., SIB15.

The list of SAIs provided by the second system information message includes SAIs supported by the serving cell and at least one of the neighboring cells. At least one of the SAIs is formatted to include mapping information that maps the SAI to one or more of the neighboring cells included in the list of neighboring cells. If none of neighboring cells support a SAI, the UE may in the case of inter-frequency neighboring cells, fail the TMGI activation with a cause of "radio conflict"; and in the case of intra-frequency neighboring cells, a handover may not be performed. Under the current standard, the situation where none of the neighboring cells support a SAI, may result in the previously described "hit and miss" or "false handover" conditions.

The apparatus also includes a SAI/neighboring cell processing component 3006 that processes the at least one SAI to determine the one or more neighboring cells that support the SAI. To this end, the SAI/neighboring cell processing component 3006 may be configured to convert the SAI to the SAI index, obtain the mapping information from the mapping region, and determine the one or more neighboring cells that support the SAI based on the mapping information. The SAI/neighboring cell processing component 3006 may also process signals received from neighboring cells 3052 to derive quality measurements, e.g., reference symbol received power (RSRP), for neighboring cells. Based on the quality measurements, the SAI/neighboring cell processing component 3006 determines whether a neighboring cell 3052 should be added to the NCL of the UE in accordance with known LTE operations. For example, the UE may determine to add a neighboring cell 3052 based on measured RSRP of the neighboring cell. Cells included in the NCL may be considered as handover candidate cells. The SAI/neighboring cell processing component 3006 may also determine whether to send an eMBMS interest indication message to the serving network.

The apparatus also includes a transmission component 3008 that may transmit an eMBMS interest indication message via a RRC connected mode, such as shown in FIG. 23, to the eNB, in response to an output from the SAI/neighbor cell processing component 3006. This message is used for purposes of obtaining assistance from the network for handover processes and carrier aggregation.

The apparatus may include additional components that perform each of the operations of the algorithm in the aforementioned flow charts of FIG. 29. As such, each operation in the aforementioned flow charts of FIG. 29 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 31:
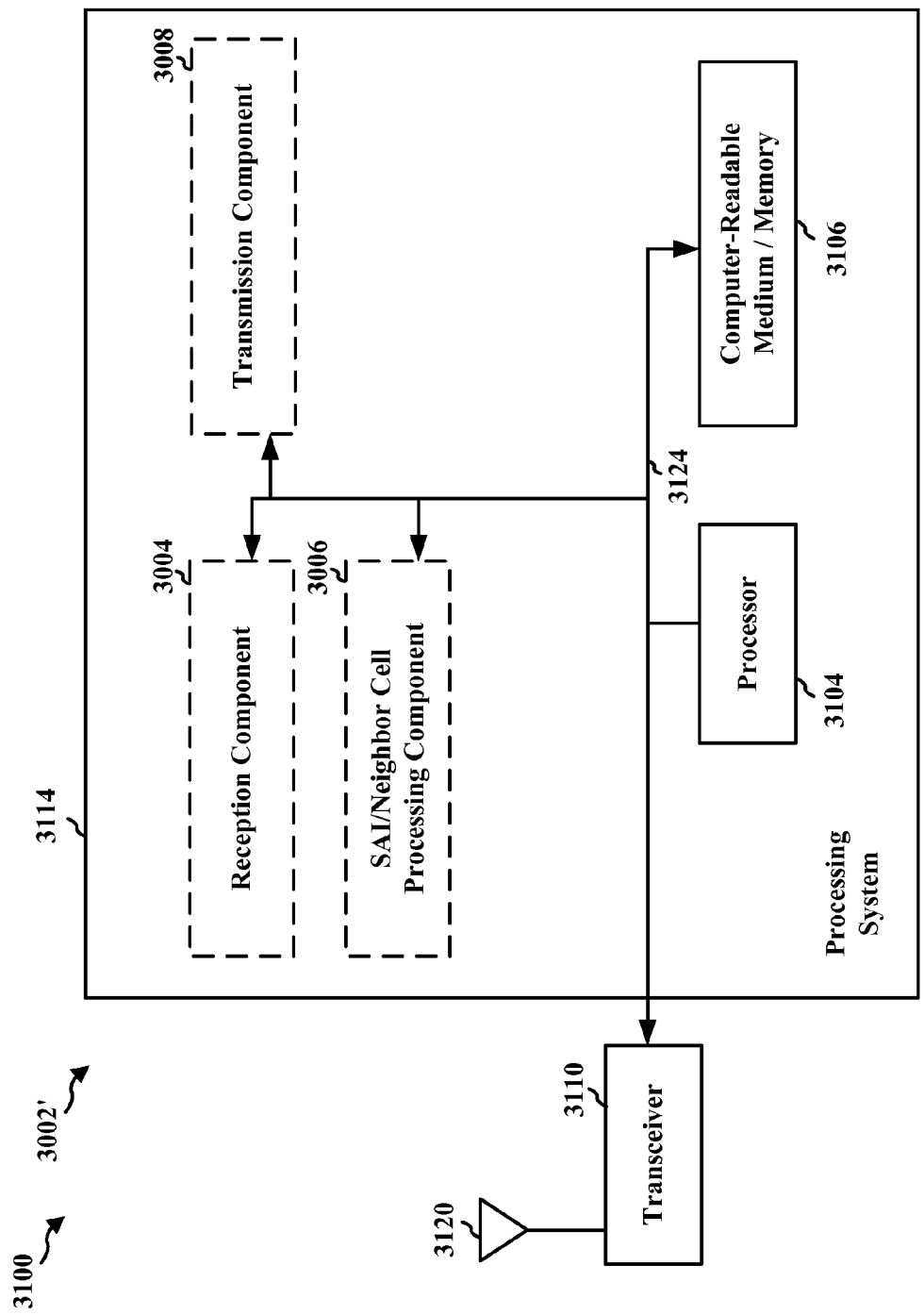
FIG. 31 is a diagram illustrating an example of a hardware implementation for an apparatus employing a processing system that implements the flow chart of FIG. 29.

FIG. 31 is a diagram 3100 illustrating an example of a hardware implementation for an apparatus 3002' employing a processing system 3114. The processing system 3114 may be implemented with a bus architecture, represented generally by the bus 3124. The bus 3124 may include any number of interconnecting buses and bridges depending on the specific application of the processing system 3114 and the overall design constraints. The bus 3124 links together various circuits including one or more processors and/or hardware components, represented by the processor 3104, the components 3004, 3006, 3008 and the computer-readable medium/memory 3106. The bus 3124 may also link various other circuits such as timing sources, peripherals, voltage regulators, and power management circuits, which are well known in the art, and therefore, will not be described any further.

The processing system 3114 may be coupled to a transceiver 3110. The transceiver 3110 is coupled to one or more antennas 3120. The transceiver 3110 provides a means for communicating with various other apparatus over a transmission medium. The transceiver 3110 receives a signal from the one or more antennas 3120, extracts information from the received signal, and provides the extracted information to the processing system 3114, specifically the reception component 3004. In addition, the transceiver 3110 receives information from the processing system 3114, specifically the transmission component 3008, and based on the received information, generates a signal to be applied to the one or more antennas 3120.

The processing system 3114 includes a processor 3104 coupled to a computer-readable medium/memory 3106. The processor 3104 is responsible for general processing, including the execution of software stored on the computer-readable medium/memory 3106. The software, when executed by the processor 3104, causes the processing system 3114 to perform the various functions described supra for any particular apparatus. The computer-readable medium/memory 3106 may also be used for storing data that is manipulated by the processor 3104 when executing software. The processing system further includes at least one of the components 3004, 3006 and 3008. The components may be software components running in the processor 3104, resident/stored in the computer readable medium/memory 3106, one or more hardware components coupled to the processor 3104, or some combination thereof. The processing system 3114 may be a component of the UE 650 and may include the memory 660 and/or at least one of the TX processor 668, the RX processor 656, and the controller/processor 659.

In one configuration, the apparatus 3002/3002' for wireless communication includes means for receiving a list of neighboring cells of a serving cell serving the UE; and means for receiving a list of SAIs, the list of SAIs including SAIs supported by the serving cell and one or more of the neighboring cells. At least one of the SAIs is formatted to include mapping information that maps the SAI to one or more of the neighboring cells included in the list of neighboring cells. The apparatus 3002/3002' for wireless communication further includes means for processing the at least one SAI to determine the one or more neighboring cells that support the SAI. The means for processing may be configured to convert the SAI to the SAI index, obtain the mapping information from the mapping region, and determine the one or more neighboring cells that support the SAI based on the mapping information. The apparatus 3002/3002' for wireless communication may further includes means for sending an interest indication message to a base station of the serving cell, the interest indication message including a PCI of a neighboring cell to which the UE wants to handover.

The aforementioned means may be one or more of the aforementioned components of the apparatus 3002 and/or the processing system 3114 of the apparatus 3002' configured to perform the functions recited by the aforementioned means. As described supra, the processing system 3114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In one configuration, a computer-readable medium/memory 3106 stores computer executable code for wireless communication by a UE camped on a serving cell. The stored code includes code for receiving a list of neighboring cells of the serving cell and code for receiving a list of service area identifiers (SAIs). The list of SAIs includes SAIs supported by the serving cell and one or more of the neighboring cells, at least one of the SAIs is formatted to include mapping information that maps the SAI to one or more of the neighboring cells included in the list of neighboring cells. The stored code further includes code for processing the at least one SAI to determine the one or more neighboring cells that support the SAI.

Figure 32:
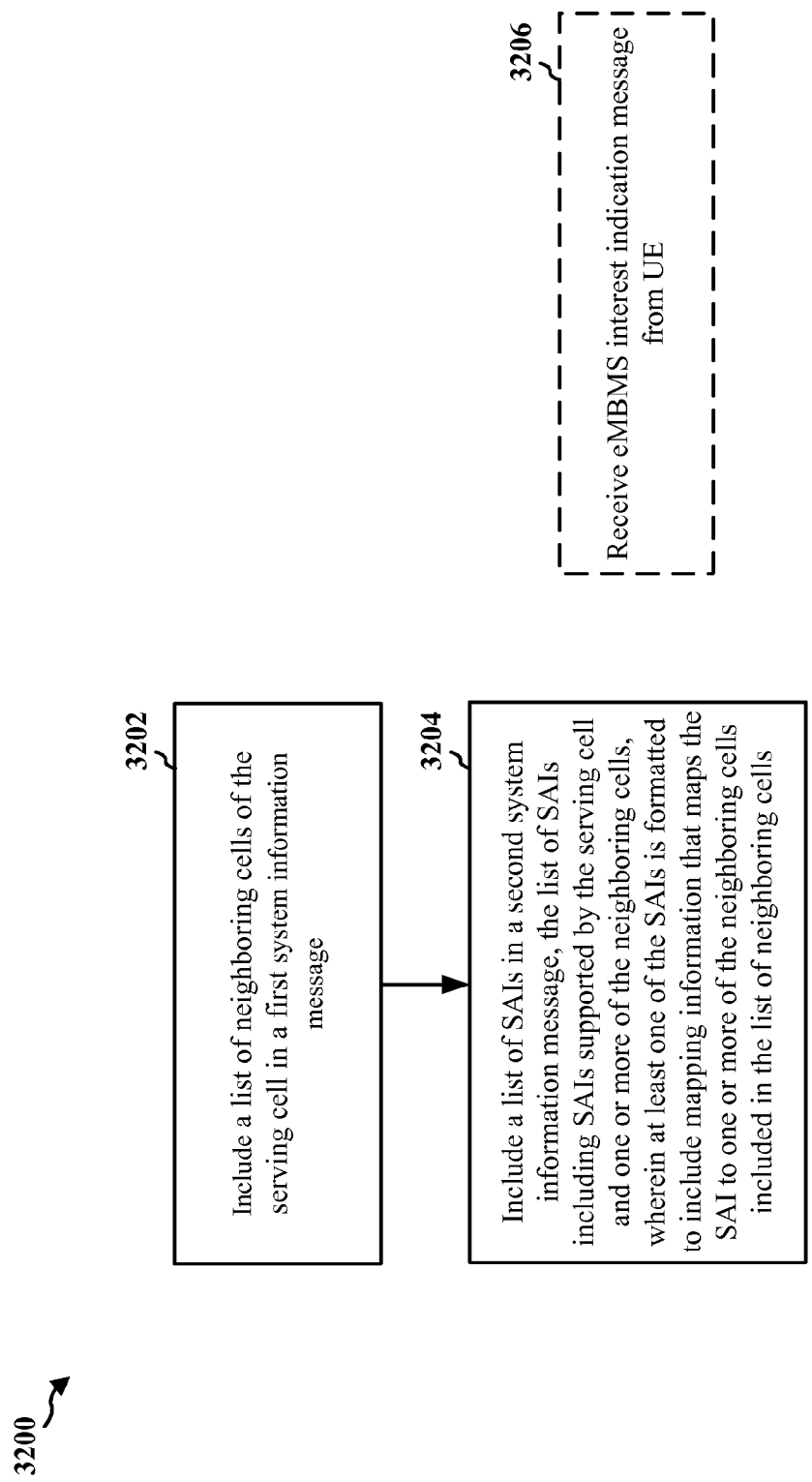
FIG. 32 is a flow chart of a method of wireless communication of a network element.

FIG. 32 is a flow chart 3200 of a method of wireless communication. The method may be performed by a network component (e.g., an eNB, the apparatus 3302/3302') supporting a serving cell. At operation 3202, the eNB includes a list of neighboring cells of the serving cell in a first system information message. The list of neighboring cells may be included in a first parameter of the first system information message. In accordance with embodiments disclosed herein, the first parameter may be a neighboring PCI list included in a SIB15, in which case SIB15 is the first system information message. For example, with reference to FIG. 14, the first parameter may be mbms-SAI-IntraFreq-r11 1416 included in SIB15 1406. In another example, with reference to FIG. 35, the first parameter may be mbms-Neighboring-PCI-List-InterFreq-r12 included in SIB15 3506. In this implementation, additional information, e.g., neighboring cell information, is included directly in SIB15 by the addition of the first parameter. In another embodiment, the first parameter may correspond to neighboring cell frequency information, e.g., PCIs, included in SIB4 or SIB5, in which case the SIB4 or SIB5 is the first system information message. For example, with reference to FIG. 21, the first parameter may be the PCIs 2122 included in SIB4 2108.

At operation 3204, the eNB includes a list of SAIs in a second system information message. The list of SAIs may be included in a second parameter of the second information message. In accordance with embodiments disclosed herein, the second parameter may be a SAI list included in SIB15, in which case SIB15 is the second information message. For example, with reference to FIG. 14, the second parameter may be mbms-SAI-IntraFreq-r11 1416 included in SIB15 1406. In another example, with reference to FIG. 35, the second parameter may be mbms-SAI-InterFreqList-r11 included in SIB15 3506. The list of SAIs includes SAIs supported by the serving cell and one or more of the neighboring cells. The at least one of the SAIs is formatted to include mapping information that maps the SAI to one or more of the neighboring cells included in the list of neighboring cells. For example, the SAI may be formatted as one of a decimal value or a hexadecimal value of a SAI index comprising a plurality of bits, and the mapping information may be included in a mapping region of the SAI index. The mapping region may correspond to a MSB region of the SAI index. Examples of SAI formatting and mapping information are included in FIGS. 15, 16, 21, and 22.

In accordance with the embodiments disclosed above, the first system information message and the second information message may be the same message, or they may be different messages. For example, the first and second information message may be a same SIB, e.g., SIB15, that includes both the list of neighboring cells and the list of SAIs. Alternatively, the first information message may be one or more of a SIB4 or SIB5 that includes the list of neighboring cells, and the second information message may be a SIB15 that includes a list of SAIs. The list of neighboring cells may include one or more of a list of intra-frequency neighboring cells, included in for example SIB4, and a list of inter-frequency neighboring cells, included in for example SIB5.

At operation 3206, the eNB transmits the first and second messages to the UE. At optional operation 3208, the eNB may receive an eMBMS interest indication message from the UE. In response to this message the eNB may perform one or more cell handover operations or carrier aggregation operations on behalf of the UE. For example, the serving eNB may initiate the handover request to a target eNB via X2 interface or negotiate the target eNB with information of Carrier Aggregation configuration and duplex type. Once the networking signaling processes are done between serving and target eNBs, the serving eNB may assist the UE for the proper cell handover or carrier aggregation process.

Figure 33:
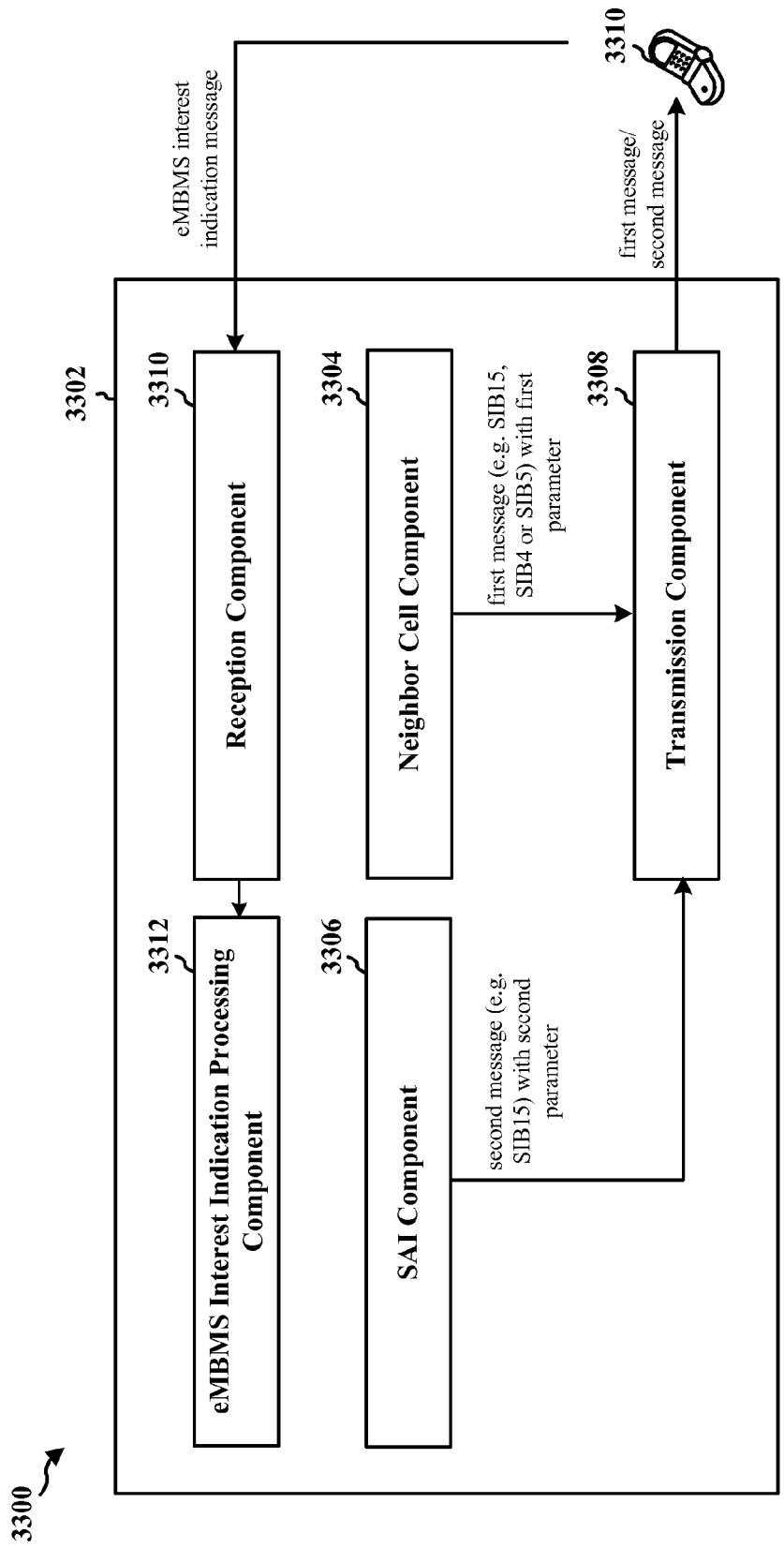
FIG. 33 is a conceptual data flow diagram illustrating the data flow between different means/components in an exemplary apparatus that implements the flow chart of FIG. 32.

FIG. 33 is a conceptual data flow diagram 3300 illustrating the data flow between different means/components in an exemplary apparatus 3302. The apparatus may be an eNB. The apparatus includes a neighbor cell component 3304 that includes a list of neighboring cells of the serving cell in a first system information message. The list of neighboring cells may be included in a first parameter of the first system information message. For example, as noted above, in some embodiments the first parameter may be a neighboring PCI list included in a SIB15. In other embodiments, the first parameter may be a neighboring PCI list included in a SIB4 or SIB 5. The neighbor cell component 3304 may include the list of neighboring cells in the first parameter of the first message based on messages received from the network within which the eNB operates. In other words, the information included in the first parameter and the first message may be preconfigured network deployment information.

The apparatus 3302 also includes a SAI component 3306 that includes a list of SAIs a second system information message. The list of SAIs may be included in a second parameter of the second system information message. In accordance with embodiments disclosed herein, the second parameter may be a SAI list included in SIB15, in which case SIB15 is the second information message. The list of SAIs includes SAIs supported by the serving cell and one or more of the neighboring cells. The at least one of the SAIs is formatted to include mapping information that maps the SAI to one or more of the neighboring cells included in the list of neighboring cells. The SAI component 3306 may include the SAI list in the second parameter of the second message based on messages received from the network within which the eNB operates. In other words, the information included in the second parameter and the second message is preconfigured network deployment information.

The apparatus 3302 also includes a transmission component 3308 that transmits the first and second messages to a UE 3310. In some embodiments, the first message and the second message may be the same. For example, SIB15 may be configured by the network to include both neighboring cell information and SAI information. In other embodiments, the first message may be SIB4 and/or SIB5 which are respectively configured to provide intra-frequency neighboring cell information and inter-frequency neighboring cell information, and the second message may be SIB15 that provides SAI information.

The apparatus may also include a reception component 3310 and an eMBMS interest indicator component 3312. The reception component 3310 may receive signals from the UE, such as an eMBMS interest indicator signal. The eMBMS interest indicator component 3312 processes the information in the signal to perform one or more cell handover operations and carrier aggregation operations on behalf of the UE.

The apparatus may include additional components that perform each of the operations of the algorithm in the aforementioned flow charts of FIG. 32. As such, each operation in the aforementioned flow charts of FIG. 32 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 34:
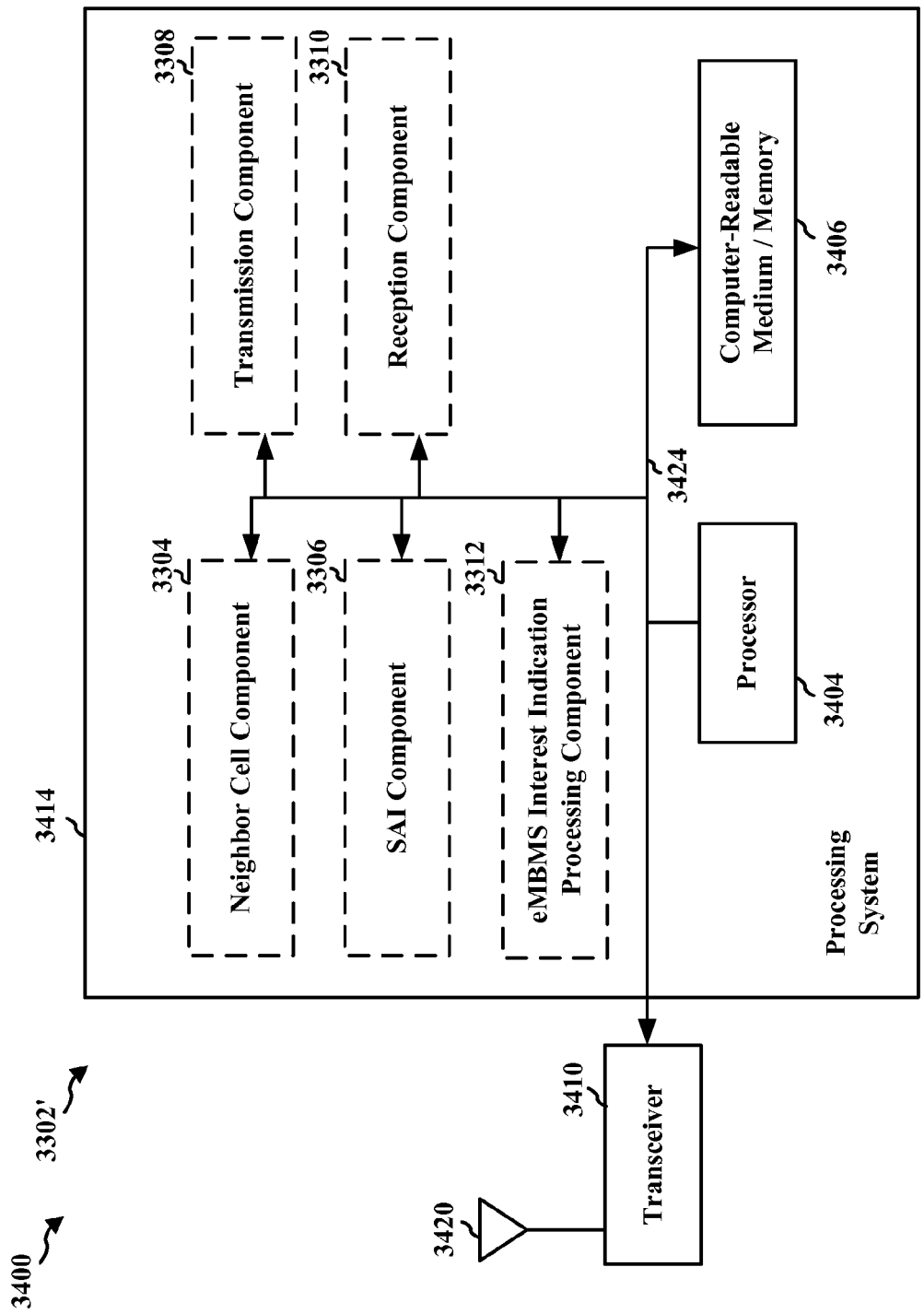
FIG. 34 is a diagram illustrating an example of a hardware implementation for an apparatus employing a processing system that implements the flow chart of FIG. 32.

FIG. 34 is a diagram 3400 illustrating an example of a hardware implementation for an apparatus 3302' employing a processing system 3414. The processing system 3414 may be implemented with a bus architecture, represented generally by the bus 3424. The bus 3424 may include any number of interconnecting buses and bridges depending on the specific application of the processing system 3414 and the overall design constraints. The bus 3424 links together various circuits including one or more processors and/or hardware components, represented by the processor 3404, the components 3304, 3306, 3308, 3310, 3312 and the computer-readable medium/memory 3406. The bus 3424 may also link various other circuits such as timing sources, peripherals, voltage regulators, and power management circuits, which are well known in the art, and therefore, will not be described any further.

The processing system 3414 may be coupled to a transceiver 3410. The transceiver 3410 is coupled to one or more antennas 3420. The transceiver 3410 provides a means for communicating with various other apparatus over a transmission medium. The transceiver 3410 receives a signal from the one or more antennas 3420, extracts information from the received signal, and provides the extracted information to the processing system 3414, specifically the reception component. In addition, the transceiver 3410 receives information from the processing system 3414, and based on the received information, generates a signal to be applied to the one or more antennas 3420.

The processing system 3414 includes a processor 3404 coupled to a computer-readable medium/memory 3406. The processor 3404 is responsible for general processing, including the execution of software stored on the computer-readable medium/memory 3406. The software, when executed by the processor 3404, causes the processing system 3414 to perform the various functions described supra for any particular apparatus. The computer-readable medium/memory 3406 may also be used for storing data that is manipulated by the processor 3404 when executing software. The processing system further includes at least one of the components 3304, 3306, 3308, 3310 and 3312. The components may be software components running in the processor 3404, resident/stored in the computer readable medium/memory 3406, one or more hardware components coupled to the processor 3404, or some combination thereof. The processing system 3414 may be a component of the eNB 610 and may include the memory 676 and/or at least one of the TX processor 616, the RX processor 670, and the controller/processor 675.

In one configuration, the apparatus 3302/3302' for wireless communication includes means for including a list of neighboring cells of a serving cell in a first system information message, and means for including a list of SAIs in a second system information message, the list of SAIs including SAIs supported by the serving cell and one or more of the neighboring cells. The at least one of the SAIs is formatted to include mapping information that maps the SAI to one or more of the neighboring cells included in the list of neighboring cells.

The aforementioned means may be one or more of the aforementioned components of the apparatus 3302 and/or the processing system 3414 of the apparatus 3302' configured to perform the functions recited by the aforementioned means. As described supra, the processing system 3414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In one configuration, a computer-readable medium 3406 stores computer executable code for wireless communication by a network component supporting a serving cell. The stored code includes code for including a list of neighboring cells of the serving cell in a first system information message; and including a list of SAIs in a second system information message. The list of SAIs includes SAIs supported by the serving cell and one or more of the neighboring cells. At least one of the SAIs is formatted to include mapping information that maps the SAI to one or more of the neighboring cells included in the list of neighboring cells.

Figure 36:
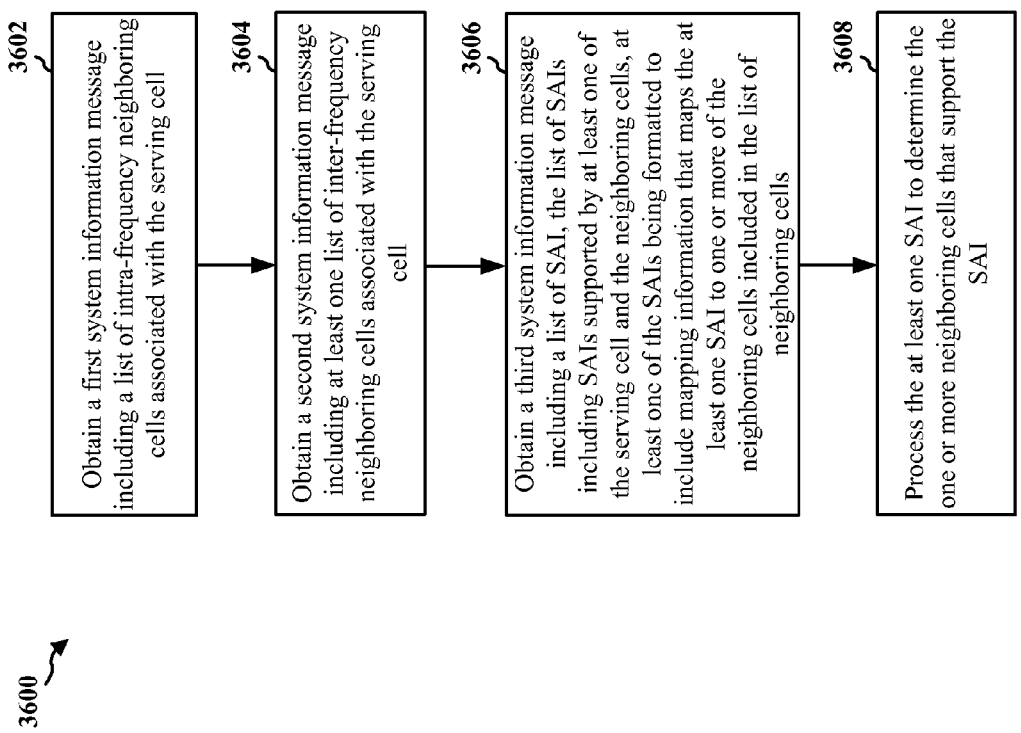
FIG. 36 is a flow chart of a method of wireless communication of a user equipment.

FIG. 36 is a flow chart 3600 of a method of wireless communication. The method may be performed by a UE camped on a serving cell. At operation 3602, the UE obtains a first system information message including a list of intra-frequency neighboring cells associated with the serving cell. The first system information message may be a SIB15 configured to include a parameter that provides the list, or a SIB4 that includes an intra-frequency neighboring cell list.

At operation 3604, the UE obtains a second system information message including at least one list of inter-frequency neighboring cells associated with the serving cell. The second system information message may be a SIB15 configured to include a parameter that provides the list, or a SIB5 that includes an inter-frequency neighboring cell list. The list of inter-frequency neighboring cells may include a plurality of lists, each list corresponding to a different carrier frequency.

FIG. 37 is a flow chart 3700 of a method of wireless communication. The method may be performed by a UE camped on a serving cell. At step 3702, the UE receives a list of neighboring cells of the serving cell in a first parameter of a first system information message. The list of neighboring cells may be identified by an index and defined in the first system information message by defining implicitly indexed groups of physical cell IDs.

At step 3704, the UE receives a list of SAIs in a second parameter of a second system information message. The list of SAIs includes SAIs supported by the serving cell and one or more of the neighboring cells. The list of SAIs is associated with a set of cells, each cell in the set identified by a PCI. In one implementation, a master list of SAIs may be provided per frequency, and the lists of SAIs carried per group of cells may be provided as a hash of the sub-list of SAIs carried on the same frequency as the cell. In another implementation, the identification of a cell that carries the list of SAIs is through a special formatting of the SAIs to include mapping information that maps the SAT to one or more of the neighboring cells included in the list of neighboring cells. The special formatting may be the bit mapping described above with reference to FIG. 29.

At step 3706, the UE processes the list of SAIs to determine the one or more neighboring cells that support the SAI.

In summary, in accordance with one or more of the alternatives disclosed herein, a UE receives a list of SAIs supported by a serving cell on which the UE is camped. The list also includes SAIs supported by the neighboring cells of the serving cell. The SAIs may be formatted to include bit mapping information that maps each SAI to one or more of the neighboring cells. The neighboring cells to be correlated via the bit mapping may correspond to neighboring cells included in a SIB message that provided the SAI list to the UE. Alternatively, the neighboring cells to be correlated via the bit mapping may be included in a list of neighboring cells provided to the UE in a separate SIB message. The bit mapping allows for the UE to obtain an exact mapping of SAIs to neighboring cells. This is beneficial in that the bit mapping provides more efficient eMBMS service activation under a multi-cells, multi-band scenario, extends intra-frequency cell coverage at the cell border, and provides for more precise request of a specific cell for carrier aggregation support to eMBMS services.

It is understood that the specific order or hierarchy of operations in the processes/flow charts disclosed is an illustration of exemplary approaches. Based upon design preferences, it is understood that the specific order or hierarchy of operations in the processes/flow charts may be rearranged. Further, some operations may be combined or omitted. The accompanying method claims present elements of the various operations in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE) camped on a serving cell, comprising:
   receiving a list of neighboring cells of the serving cell on which the UE is camped;
   receiving a list of service area identifiers (SAIs) supported by the serving cell and one or more of the neighboring cells, wherein the list of SAIs comprises a transposed SAI including a first SAI index and a neighbor cell index for each of the neighboring cells included in the list of neighboring cells, wherein the neighbor cell index indicates the availability of the first SAI in the corresponding neighbor cell; and
   processing the transposed SAI to determine one or more neighboring cells that support the first SAI in the list of SAIs.

2. The method of claim 1, wherein the first SAI is formatted as one of a decimal value or hexadecimal value of a SAI index comprising a plurality of bits and mapping information is included in a mapping region of the SAI index, and the processing comprises:
   converting the first SAI to the SAI index;
   obtaining the mapping information from the mapping region;
   determining the one or more neighboring cells that support the first SAI based on the mapping information.

3. The method of claim 2, wherein the mapping region of the SAI index corresponds to a most significant bit (MSB) region of the SAI index.

4. The method of claim 3, wherein the MSB region comprises a plurality of extension bits and the mapping region corresponds to one or more of the plurality of extension bits.

5. The method of claim 2, wherein the mapping region comprises one bit for each of the one or more neighboring cells.

6. The method of claim 5, wherein a value of a bit corresponding to a neighboring cell indicates whether that neighboring cell supports the first SAI.

7. The method of claim 1, further comprising sending an interest indication message to the serving cell, the interest indication message including a physical cell identification (PCI) of a neighboring cell to which the UE wants to handover.

8. The method of claim 7, wherein the interest indication message further includes a carrier aggregation index (CAI) to initiate carrier aggregation support on the neighboring cell corresponding to the PCI.

9. The method of claim 8, wherein the CAI indicates to a network entity of the serving cell a preferred function for the neighboring cell, the preferred function being one of: service as a secondary component carrier, service as a primary component carrier, or service as a configurable secondary cell that refers to a down link only carrier.

10. The method of claim 1, wherein the list of SAIs is associated with a set of cells, and each cell in the set of cells is identified by a physical cell identification (PCI).

11. The method of claim 10, wherein the list of neighboring cells is obtained based on an index included in a first system information message received by the UE, the index implicitly defining, for at least one SAI in the list of SAIs, a set of PCIS that support the at least one SAI.

12. A user equipment (UE) for wireless communication, comprising:
   a memory; and
   at least one processor coupled to the memory and configured to:
      receive a list of neighboring cells of a serving cell serving the UE on which the UE is camped;
      receive a list of service area identifiers (SAIs) supported by the serving cell and one or more of the neighboring cells, wherein the list of SAIs comprises a transposed SAI including a first SAI index and a neighbor cell index for each of the neighboring cells included in the list of neighboring cells, wherein the neighbor cell index indicates the availability of the first SAI in the corresponding neighbor cell; and
      process the transposed SAI to determine one or more neighboring cells that support the first SAI in the list of SAIs.

13. The UE of claim 12, wherein the first SAI is formatted as one of a decimal value or hexadecimal value of a SAI index comprising a plurality of bits and mapping information is included in a mapping region of the SAI index, and the at least one processor processes the first SAI by:
   converting the first SAI to the SAI index;
   obtaining the mapping information from the mapping region;
   determining the one or more neighboring cells that support the first SAI based on the mapping information.

14. The UE of claim 13, wherein the mapping region of the SAI index corresponds to a most significant bit (MSB) region of the SAI index.

15. The UE of claim 13, wherein the mapping region comprises one bit for each of the one or more neighboring cells.

16. The UE of claim 12, wherein the at least one processor is further configured to send an interest indication message to the serving cell, the interest indication message including a physical cell identification (PCI) of a neighboring cell to which the UE wants to handover.

17. The UE of claim 16, wherein the interest indication message further includes a carrier aggregation index (CAI) to initiate carrier aggregation support on the neighboring cell corresponding to the PCI.

18. A method of wireless communication of a network component supporting a serving cell, comprising:
including a list of neighboring cells of the serving cell in a first system information message; and
including a list of service area identifiers (SAIs) in a second system information message, the list of SAIs including a plurality of SAIs supported by the serving cell and one or more of the neighboring cells,
wherein at least one of the plurality SAIs includes a transposed SAI including a first SAI and a neighbor cell index for each of the neighboring cells included in the list of neighboring cells, wherein the neighbor cell index indicates the availability of the first SAI in the corresponding neighbor cell.

19. The method of claim 18, wherein the first system information message and the second system information message are the same message.

20. The method of claim 19, wherein the same message comprises a system information block (SIB).

21. The method of claim 20, wherein the SIB is SIB15.

22. The method of claim 18, wherein the first system information message and the second system information message are different messages.

23. The method of claim 22, wherein the first system information message comprises one of SIB4 and SIB5 and the second system information message comprises SIB15.

24. The method of claim 18, wherein:
the transposed SAI is formatted to include a decimal value or hexadecimal value of a SAI index comprising a plurality of bits; and
mapping information is included in a mapping region of the SAI index.

25. The method of claim 24, wherein the mapping region corresponds to a most significant bit (MSB) region of the SAI index.

26. An apparatus for wireless communication, comprising:
a memory; and
at least one processor coupled to the memory and configured to:
include a list of neighboring cells of a serving cell in a first system information message; and
include a list of service area identifiers (SAIs) in a second system information message, the list of SAIs including a plurality of SAIs supported by the serving cell and one or more of the neighboring cells,
wherein at least one of the plurality SAIs includes a transposed SAI including a first SAI and a neighbor cell index for each of the neighboring cells included in the list of neighboring cells, wherein the neighbor cell index indicates the availability of the first SAI in the corresponding neighbor cell.

27. The apparatus of claim 26, wherein the first system information message and the second system information message are the same message.

28. The apparatus of claim 26, wherein the first system information message and the second system information message are different messages.

29. The apparatus of claim 26, wherein:
the transposed SAI is formatted to include a decimal value or hexadecimal value of a SAI index comprising a plurality of bits; and
mapping information is included in a mapping region of the SAI index.

30. The apparatus of claim 29, wherein the mapping region corresponds to a most significant bit (MSB) region of the SAI index.

* * * * *